(12) United States Patent  
Groat et al.

(10) Patent No.: US 12,410,997 B2  
(45) Date of Patent: Sep. 9, 2025

(54) AMMUNITION MAGAZINE POUCH AND METHODS OF ASSEMBLING SAME

(71) Applicant: Safe Life Defense, LLC, Henderson, NV (US)

(72) Inventors: Nick Groat, Henderson, NV (US); Cody Shafer, Henderson, NV (US)

(73) Assignee: Safe Life Defense, L.L.C., Henderson, NV (US)

( * ) Notice: Subject to any disclaimer, the term of this patent is extended or adjusted under 35 U.S.C. 154(b) by 399 days.

(21) Appl. No.: 17/980,464

(22) Filed: Nov. 3, 2022

(65) Prior Publication Data

US 2023/0138301 A1     May 4, 2023

Related U.S. Application Data

(60) Provisional application No. 63/275,266, filed on Nov. 3, 2021.

(51) Int. Cl.
| | |
|---|---|
| *F42B 39/02* | (2006.01) |
| *B29C 51/10* | (2006.01) |
| *B29C 51/20* | (2006.01) |
| *B29C 51/26* | (2006.01) |
| *B29C 51/42* | (2006.01) |

(52) U.S. Cl.  
CPC .............. *F42B 39/02* (2013.01); *B29C 51/10* (2013.01); *B29C 51/20* (2013.01); *B29C 51/262* (2013.01); *B29C 51/266* (2013.01); *B29C 51/421* (2013.01)

(58) Field of Classification Search  
CPC ...... Y10S 224/931; F42B 39/02; F42B 39/26; F42B 39/00; F42B 39/08; A45F 5/02; A45F 5/021

USPC ......................................................... 224/931  
See application file for complete search history.

(56) References Cited

U.S. PATENT DOCUMENTS

| | | | |
|---|---|---|---|
| 3,153,813 A | 10/1964 | Swick | |
| 3,368,243 A | 2/1968 | Nuri | |
| 4,079,232 A | 3/1978 | Brokoff | |
| 4,119,249 A * | 10/1978 | Hanson | A45C 11/00 |
| | | | 224/679 |

(Continued)

FOREIGN PATENT DOCUMENTS

| | | |
|---|---|---|
| CN | 111421794 B | 11/2020 |
| DE | 100 40 390 A1 | 2/2002 |
| KR | 10-2060561 B1 | 2/2020 |

*Primary Examiner* — Adam J Waggenspack  
(74) *Attorney, Agent, or Firm* — Howard & Howard Attorneys PLLC

(57) ABSTRACT

An ammunition magazine pouch is described herein. The ammunition magazine pouch includes a magazine support assembly including an interior surface defining a magazine chamber extending between an open top end and a closed bottom end. The magazine chamber is sized and shaped to receive at least one ammunition magazine therein. The magazine support assembly includes a front cover member including an inner surface defining a portion of the magazine chamber, a back plate member coupled to the front cover member to define the magazine chamber therebetween, and a tensioning assembly coupled to the front cover member and the back plate assembly for adjusting a distance between an upper portion of the front cover member and an upper portion of the back plate member to adjust a width of the open top end of the magazine chamber.

14 Claims, 42 Drawing Sheets

(56) References Cited

U.S. PATENT DOCUMENTS

| | | | | |
|---|---|---|---|---|
| 4,843,649 | A | * | 7/1989 | Jewell .................... F42B 39/02 224/931 |
| 5,724,707 | A | * | 3/1998 | Kirk ........................ A45F 5/02 224/675 |
| 5,980,231 | A | | 11/1999 | Arends |
| 7,448,115 | B2 | * | 11/2008 | Howell .............. A44B 13/0052 24/3.12 |
| 7,963,427 | B2 | * | 6/2011 | Calkin ............... A41D 13/0012 224/675 |
| 8,474,670 | B1 | * | 7/2013 | Gregory ............. F41C 33/0263 224/912 |
| 8,485,405 | B2 | * | 7/2013 | Crye ..................... F42B 39/02 224/931 |
| 10,159,330 | B2 | * | 12/2018 | Kovac .................... A45F 5/021 |
| 10,274,296 | B2 | * | 4/2019 | Tedder ................... F42B 39/02 |
| 10,605,574 | B2 | * | 3/2020 | Swan ..................... F41H 5/013 |
| 10,724,820 | B1 | * | 7/2020 | Zhang .................... F41A 35/02 |
| 11,085,716 | B2 | * | 8/2021 | Zhang .................... F41A 17/38 |
| 2004/0200111 | A1 | * | 10/2004 | Horn ...................... A45F 5/021 42/50 |
| 2017/0231372 | A1 | * | 8/2017 | Metayer ............... F41C 33/041 224/222 |
| 2017/0247131 | A1 | | 8/2017 | Klocke |
| 2023/0073359 | A1 | | 3/2023 | Kukuk |

\* cited by examiner

AMMUNITION MAGAZINE POUCH AND METHODS OF ASSEMBLING SAME

CROSS-REFERENCE TO RELATED APPLICATIONS

This application claims the benefit of U.S. Provisional Patent Application Ser. No. 63/275,266, filed on Nov. 3, 2021, the disclosure of which are hereby incorporated by reference in its entirety for all purposes.

FIELD OF THE INVENTION

This invention relates generally to an ammunition magazine pouch and a molding assembly for forming the ammunition magazine pouch.

BACKGROUND OF THE INVENTION

Law enforcement personal typically wear duty belts with equipment that includes but is not limited to a holstered handgun, holstered taser, holstered pepper-spray, and spare ammunition. Law enforcement personal are required to carry spare ammunition magazines on their duty belt. The device for holding the spare ammunition magazines in this case are critical because they can limit the speed of access to the magazines when re-loading the handgun. However, the size of the case must be as small as possible so that the positioning on the duty belt is comfortable for the police officer.

The present invention addresses one or more of the aforementioned challenges.

SUMMARY OF THE INVENTION

In one aspect of the present invention, an ammunition magazine pouch is provided. The ammunition magazine pouch includes a magazine support assembly including an interior surface defining a magazine chamber extending between an open top end and a closed bottom end. The magazine chamber is sized and shaped to receive at least one ammunition magazine therein. The magazine support assembly includes a front cover member including an inner surface defining a portion of the magazine chamber, a back plate member coupled to the front cover member to define the magazine chamber therebetween, and a tensioning assembly coupled to the front cover member and the back plate member for adjusting a distance between an upper portion of the front cover member and an upper portion of the back plate member to adjust a width of the open top end of the magazine chamber.

In another aspect of the present invention, a method of manufacturing an ammunition magazine pouch is provided. The pouch includes an interior surface defining a magazine chamber configured to receive an ammunition magazine therein. The method includes thermoforming a front cover member from a first sheet of thermoplastic material and thermoforming a back plate member from a second sheet of thermoplastic material. The method also includes stitching the back plate member to an attachment assembly and coupling the front cover member to the back plate member to define the magazine chamber therebetween extending between an open top end and a closed bottom end. The method also includes coupling a tensioning assembly to the front cover member and the back plate member to adjust a distance between an upper portion of the front cover member and an upper portion of the back plate member to adjust a width of the open top end of the magazine chamber.

In a further aspect of the present invention, a system for manufacturing an ammunition magazine pouch is provided. The system includes a thermoplastic machine assembly including a support frame, a heat press machine mounted to the support frame, a vacuum forming machine assembly mounted to the support frame adjacent to the heat press machine, and a support sled slideably coupled to the support frame and movable between the heat press machine and the vacuum forming machine.

BRIEF DESCRIPTION OF THE DRAWINGS

Other advantages of the present invention will be readily appreciated as the same becomes better understood by reference to the following detailed description when considered in connection with the accompanying drawings wherein.

Corresponding reference characters indicate corresponding parts throughout the drawings.

DETAILED DESCRIPTION OF THE INVENTION

Figure 1A:
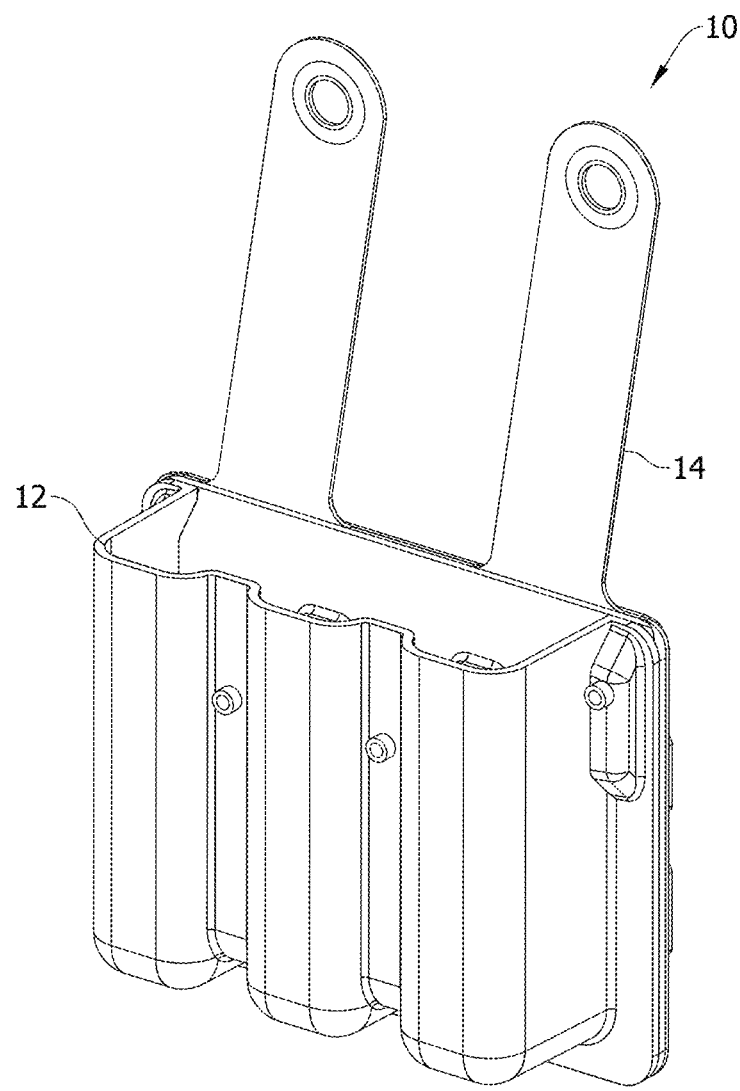
FIGS. 1A-20 are perspective views of an ammunition magazine pouch, according to embodiments of the present invention.
Figure 1B:
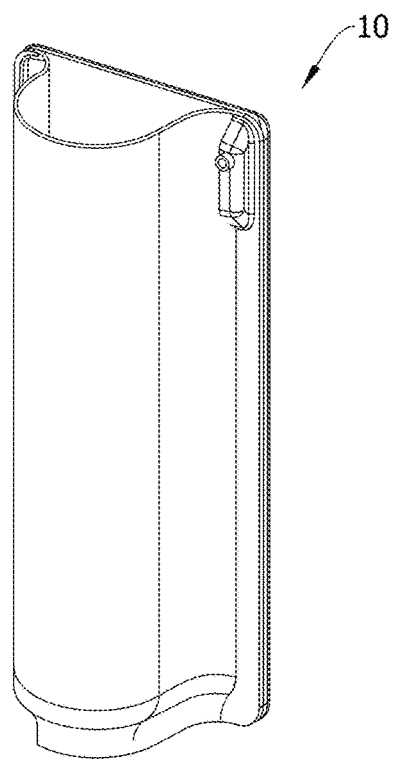
Figure 1C:
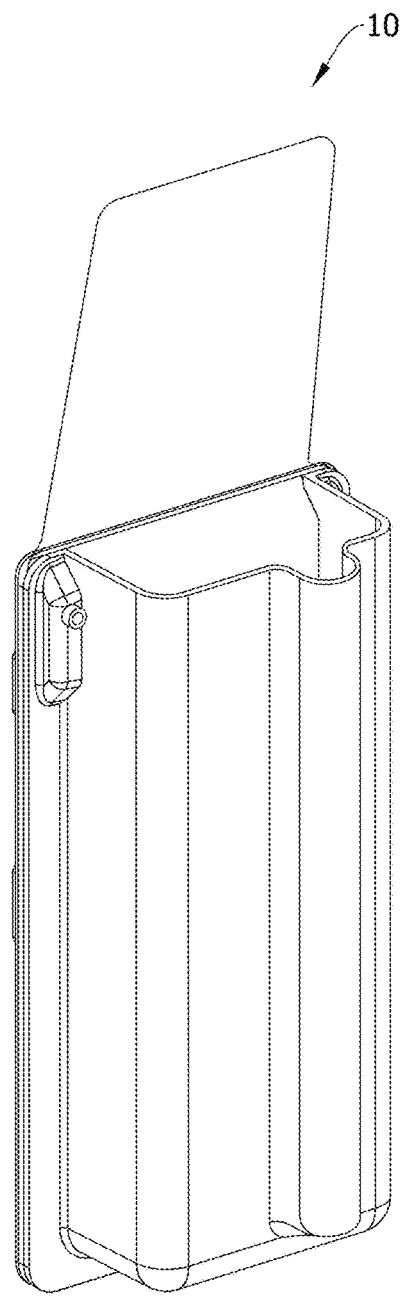
Figure 1D:
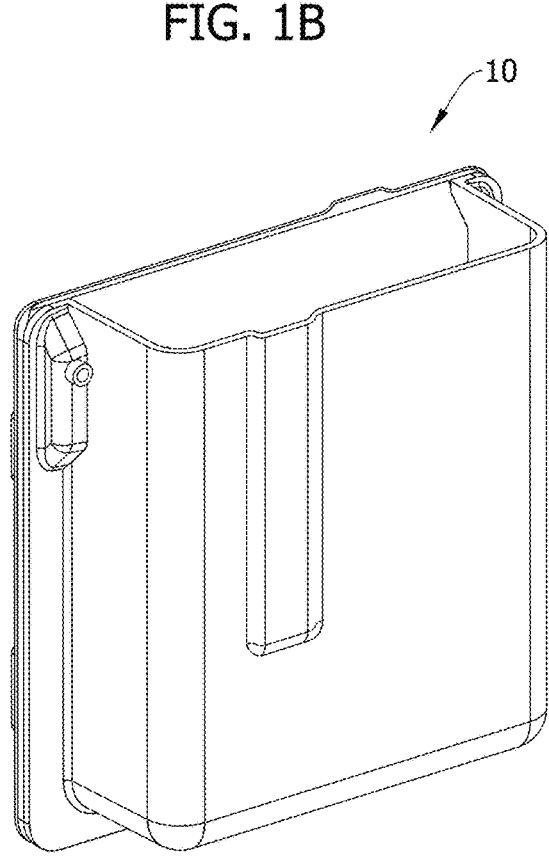
Figure 2:
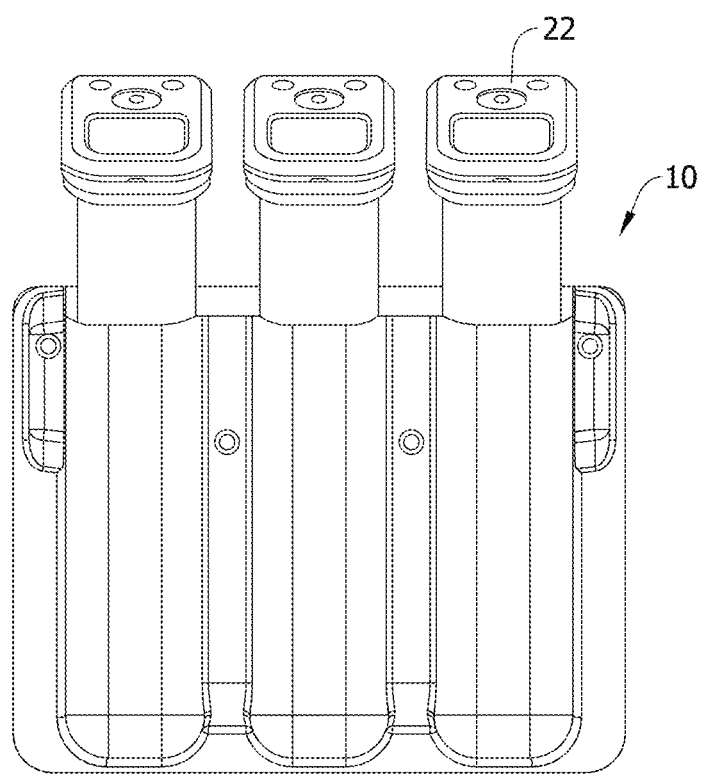
Figure 3:
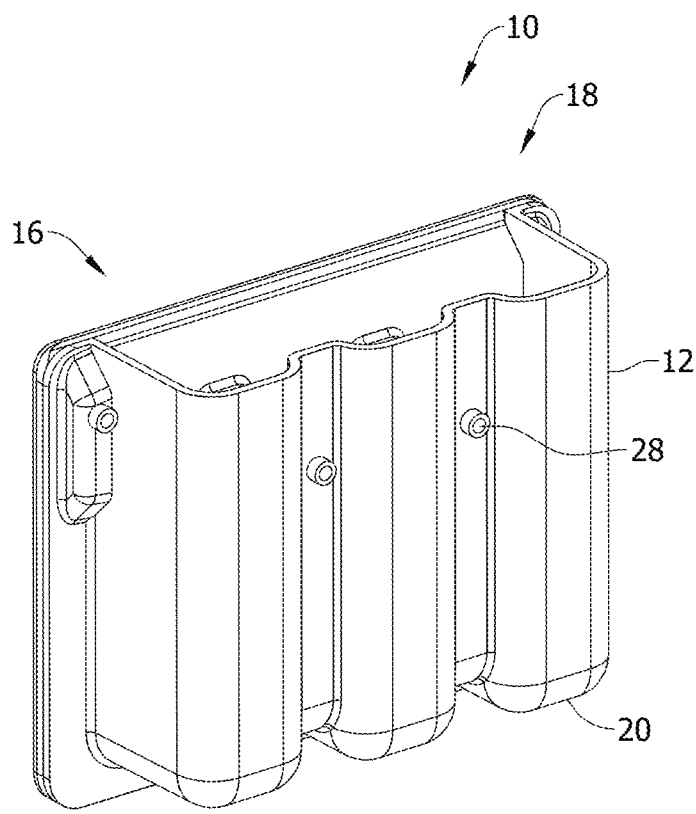
Figure 4:
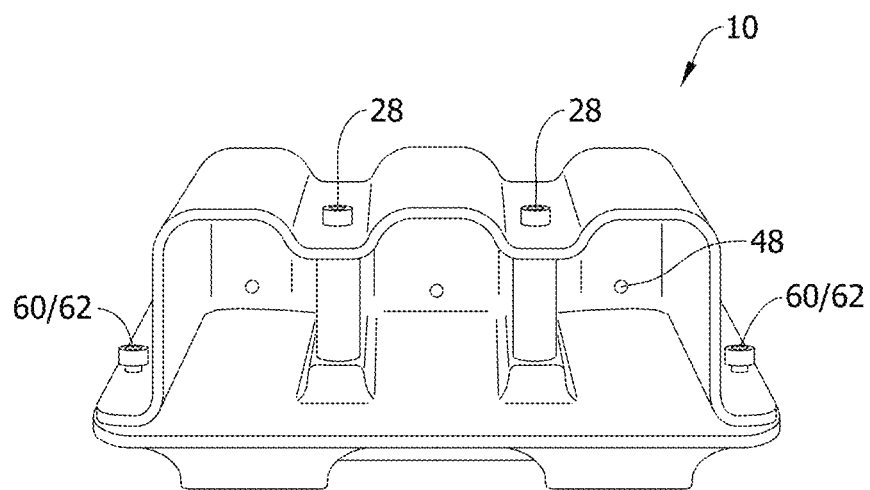
Figure 5:
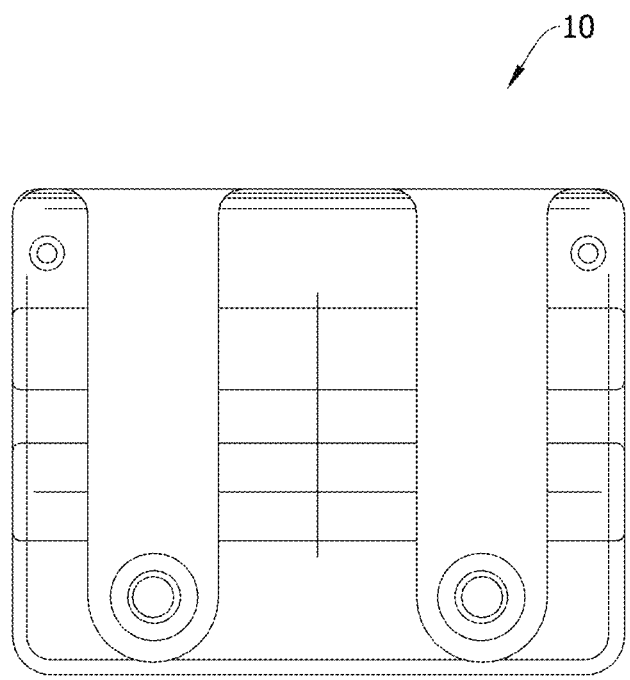
Figure 6:
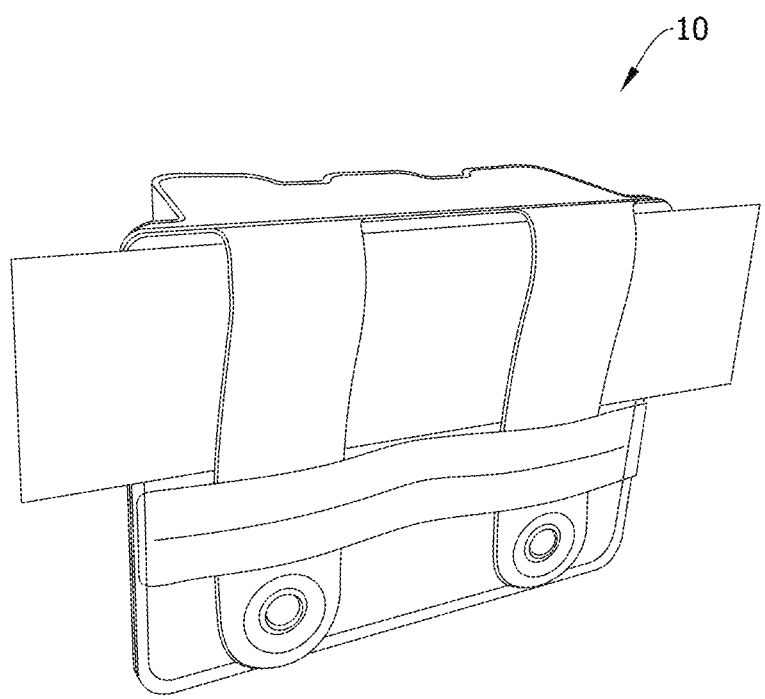
Figure 7:
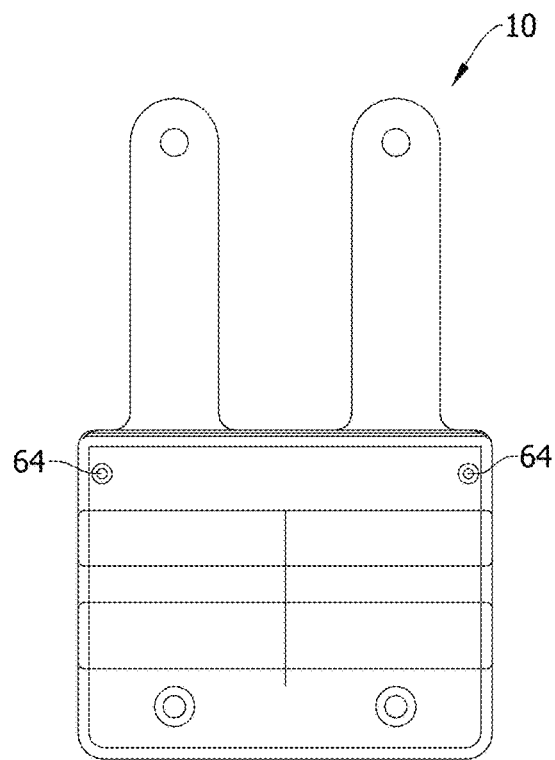
Figure 8:
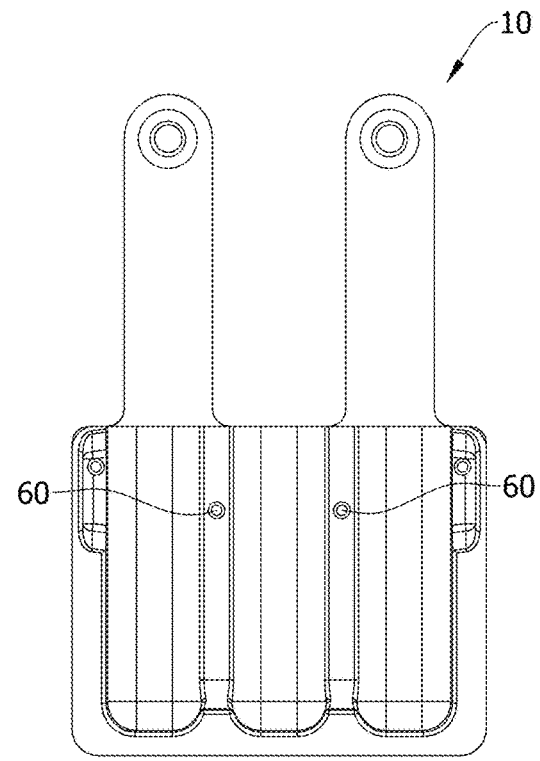
Figure 9:
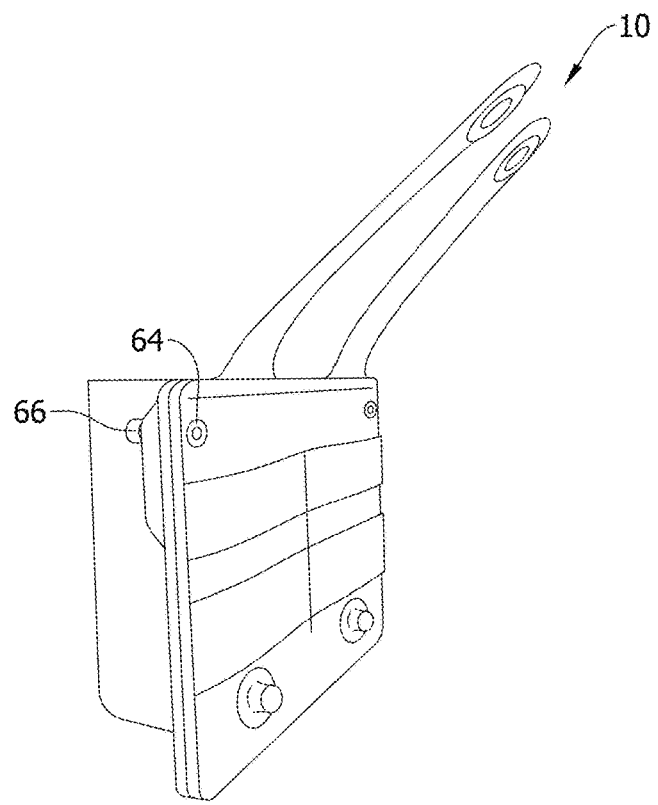
Figure 10:
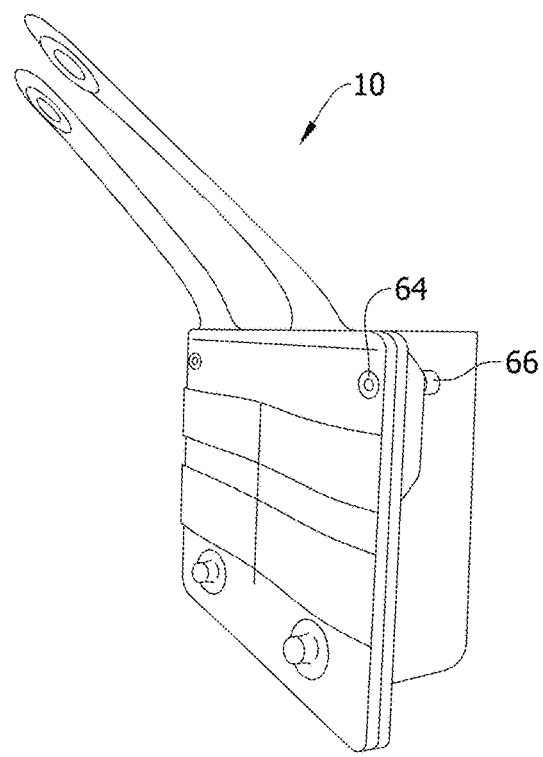
Figure 11:
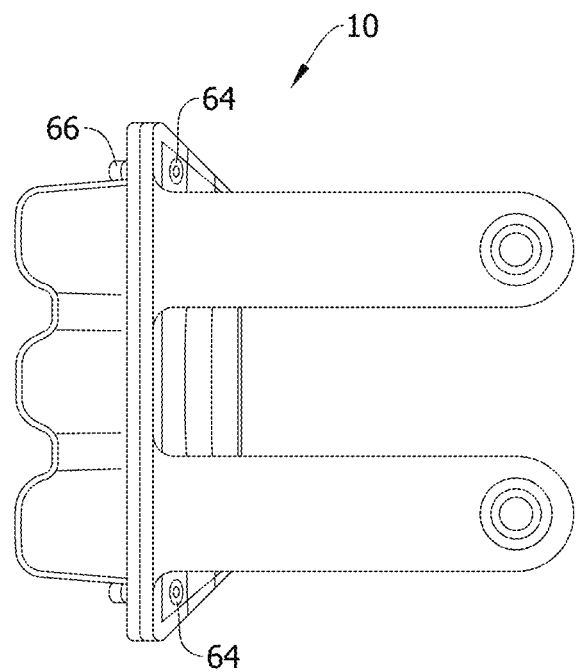
Figure 12:
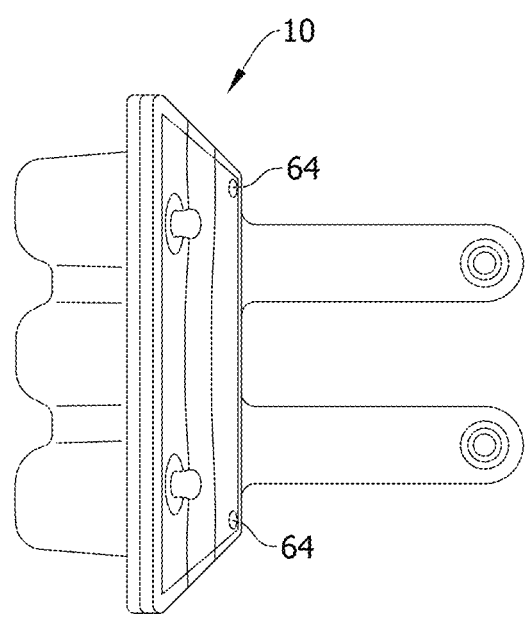
Figure 13:
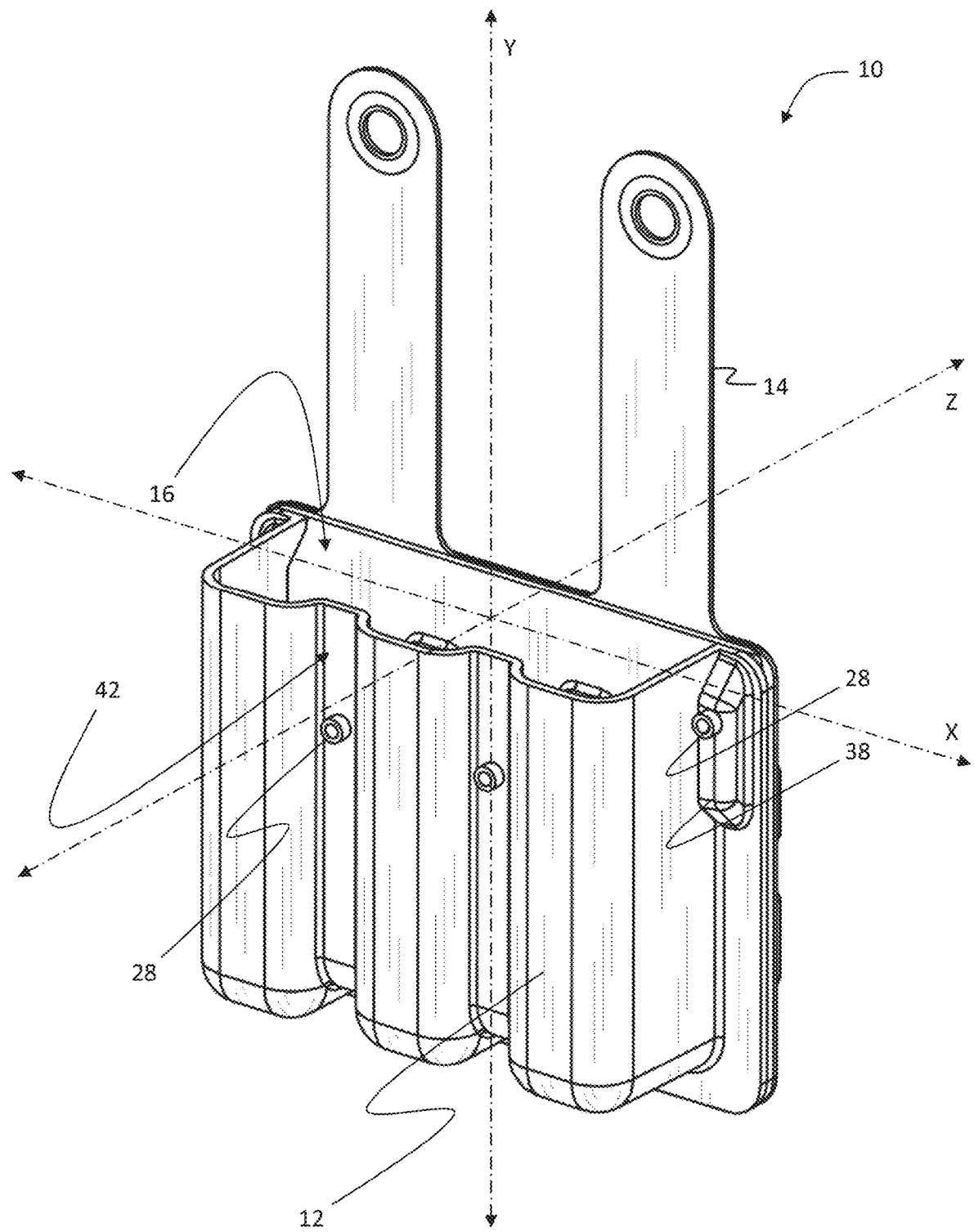
Figure 14:
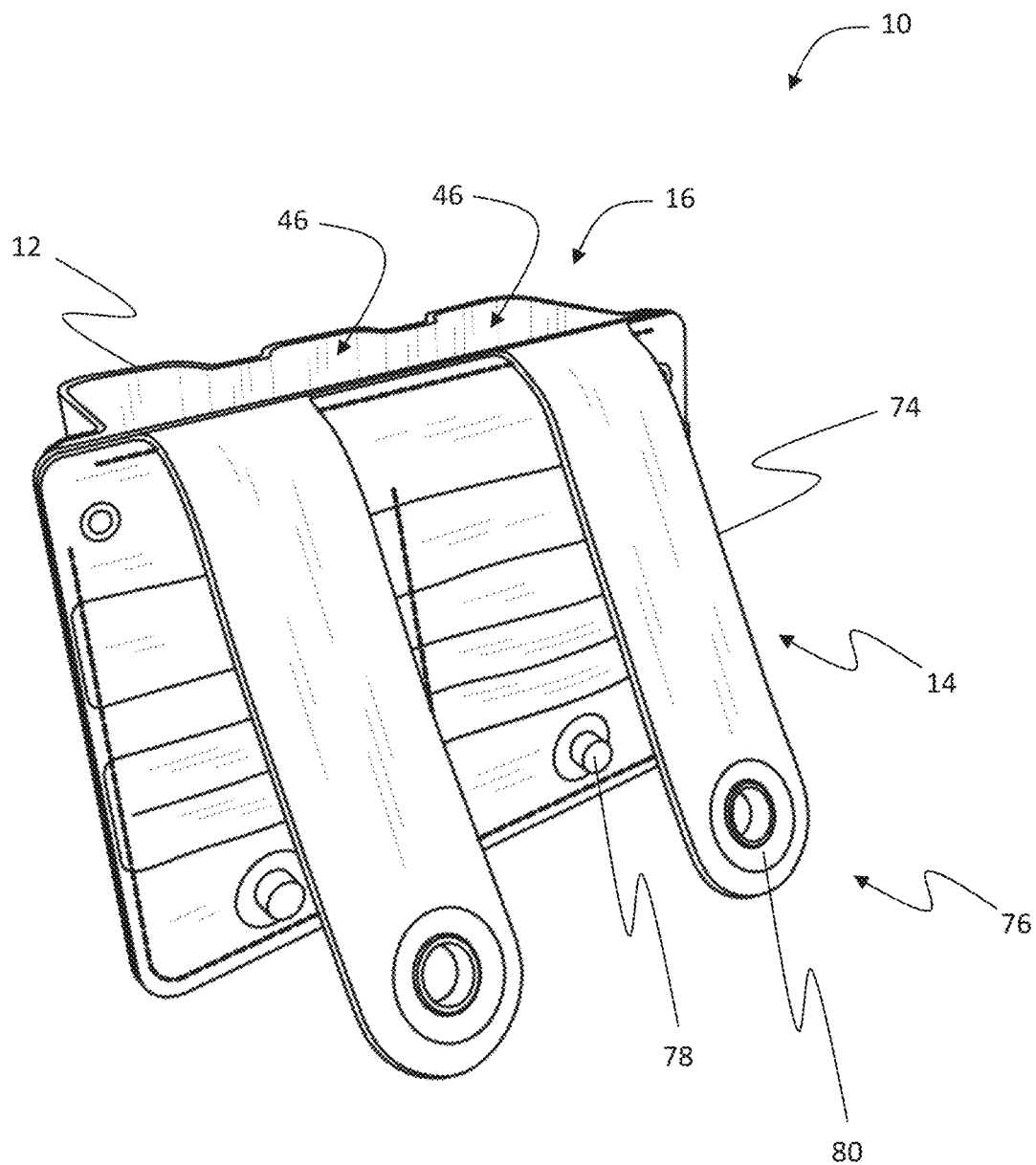
Figure 15:
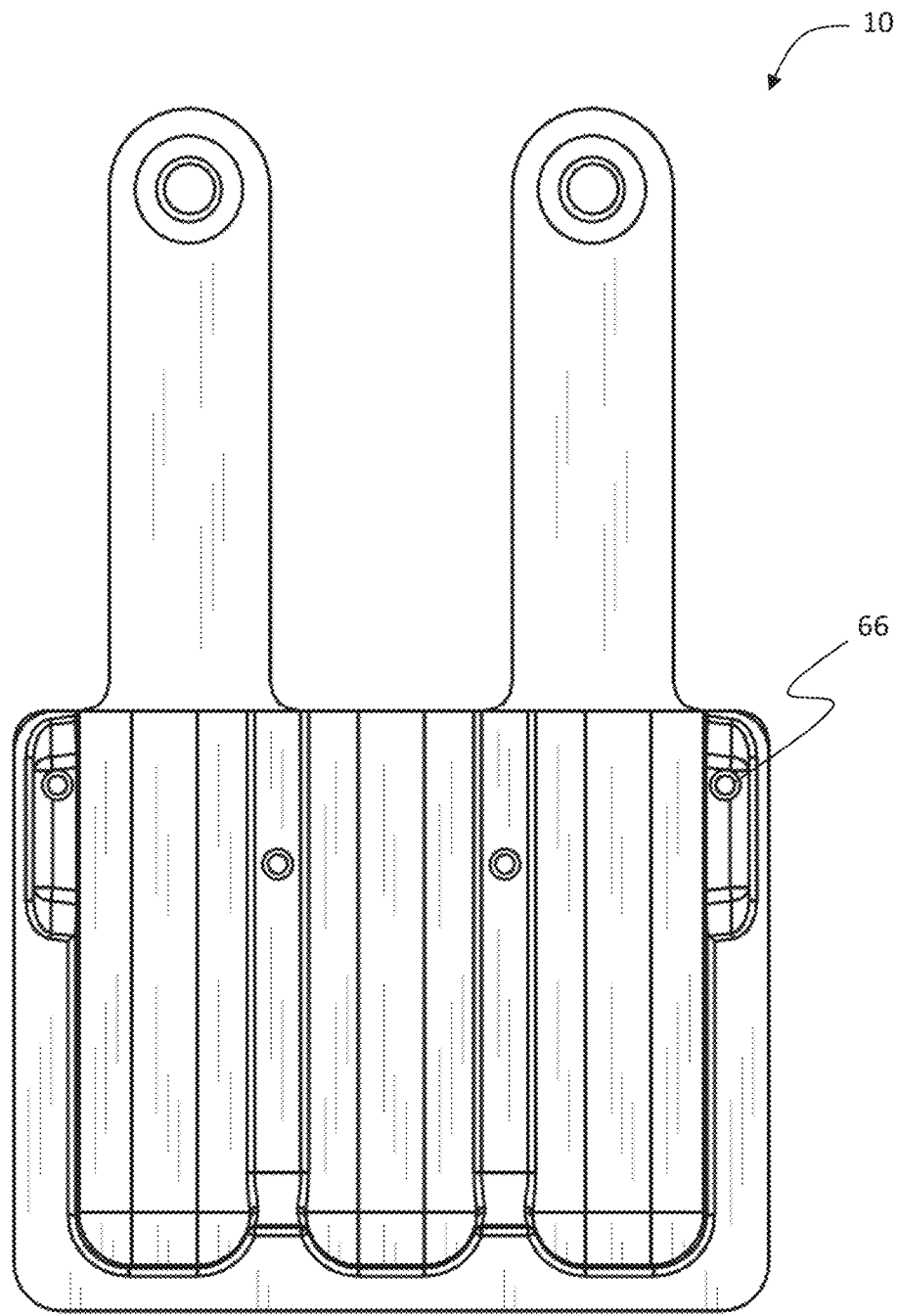
Figure 16:
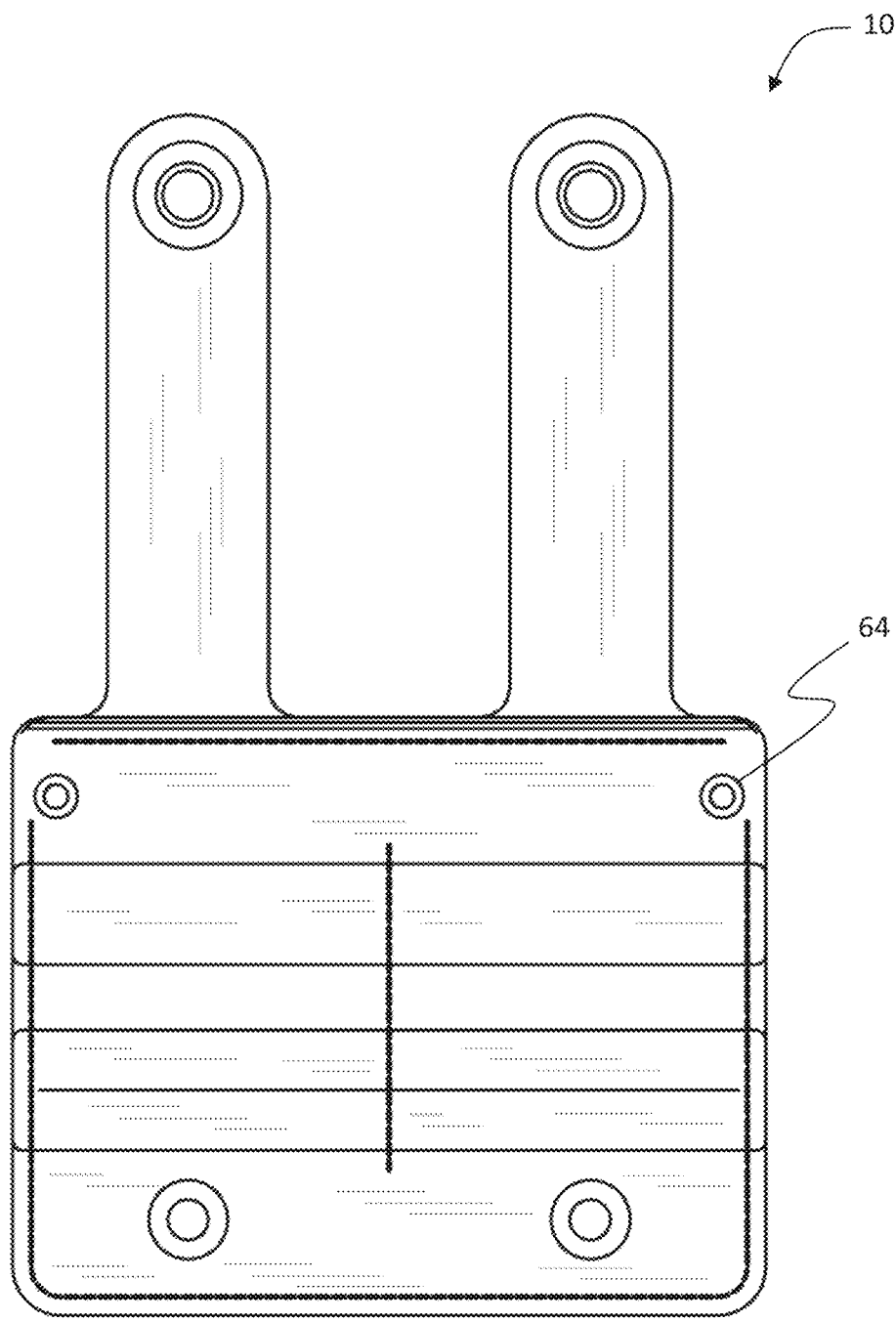
Figures 17, 18:
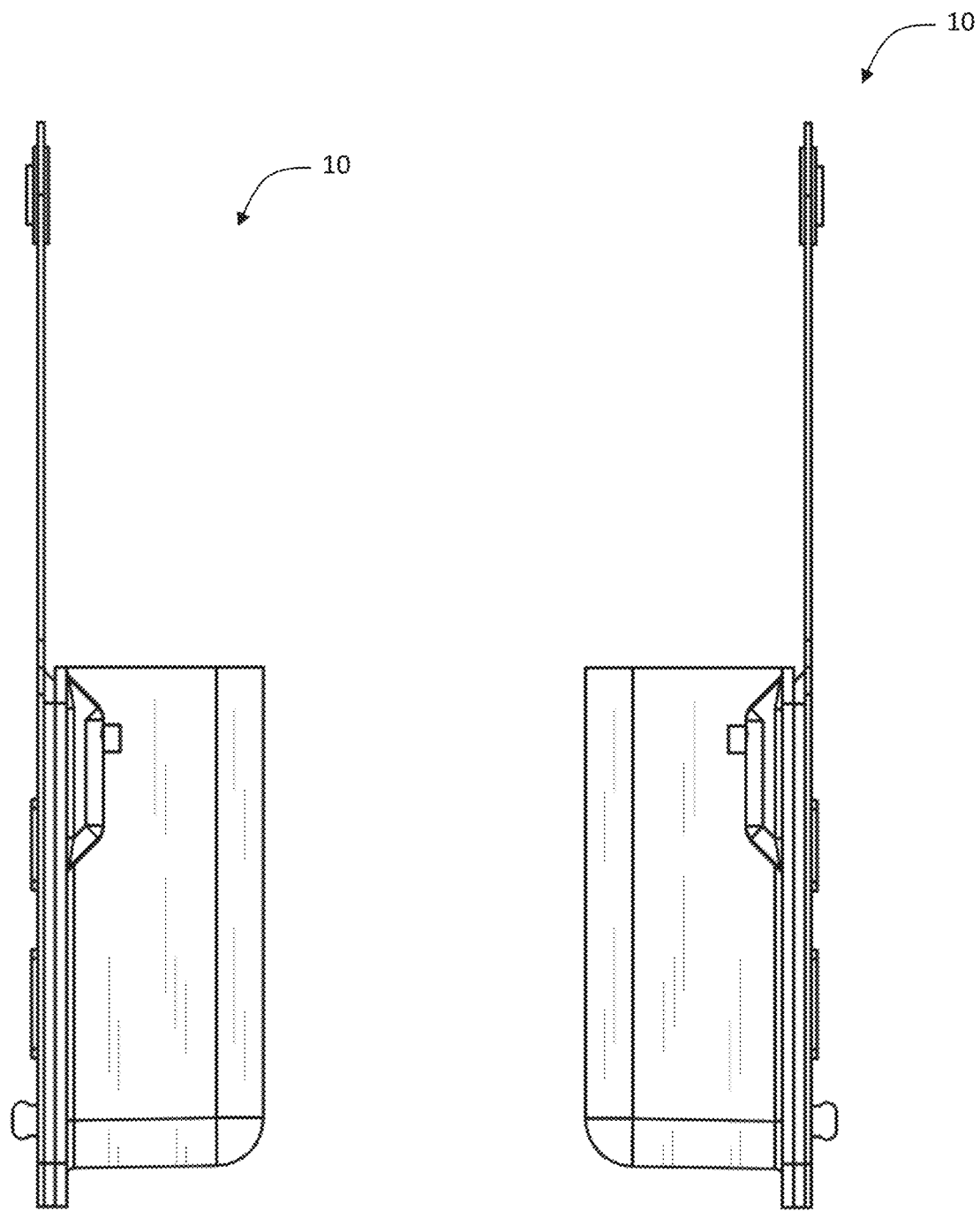
Figure 19:
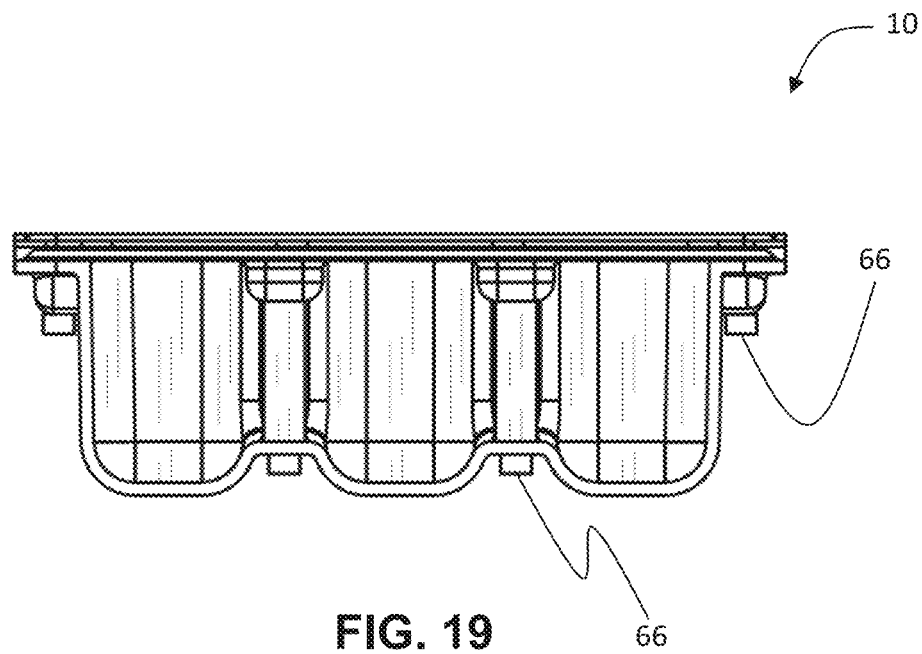
Figure 20:
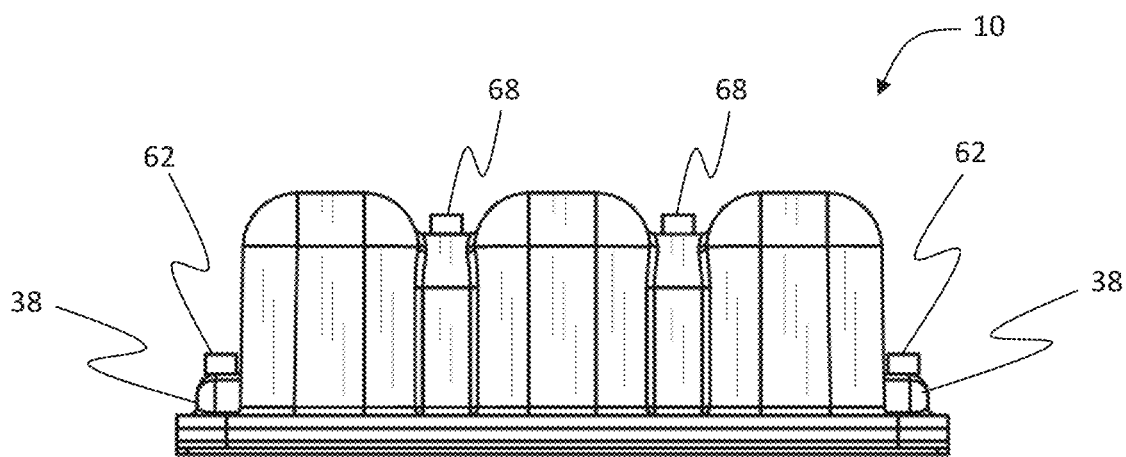
Figure 21:
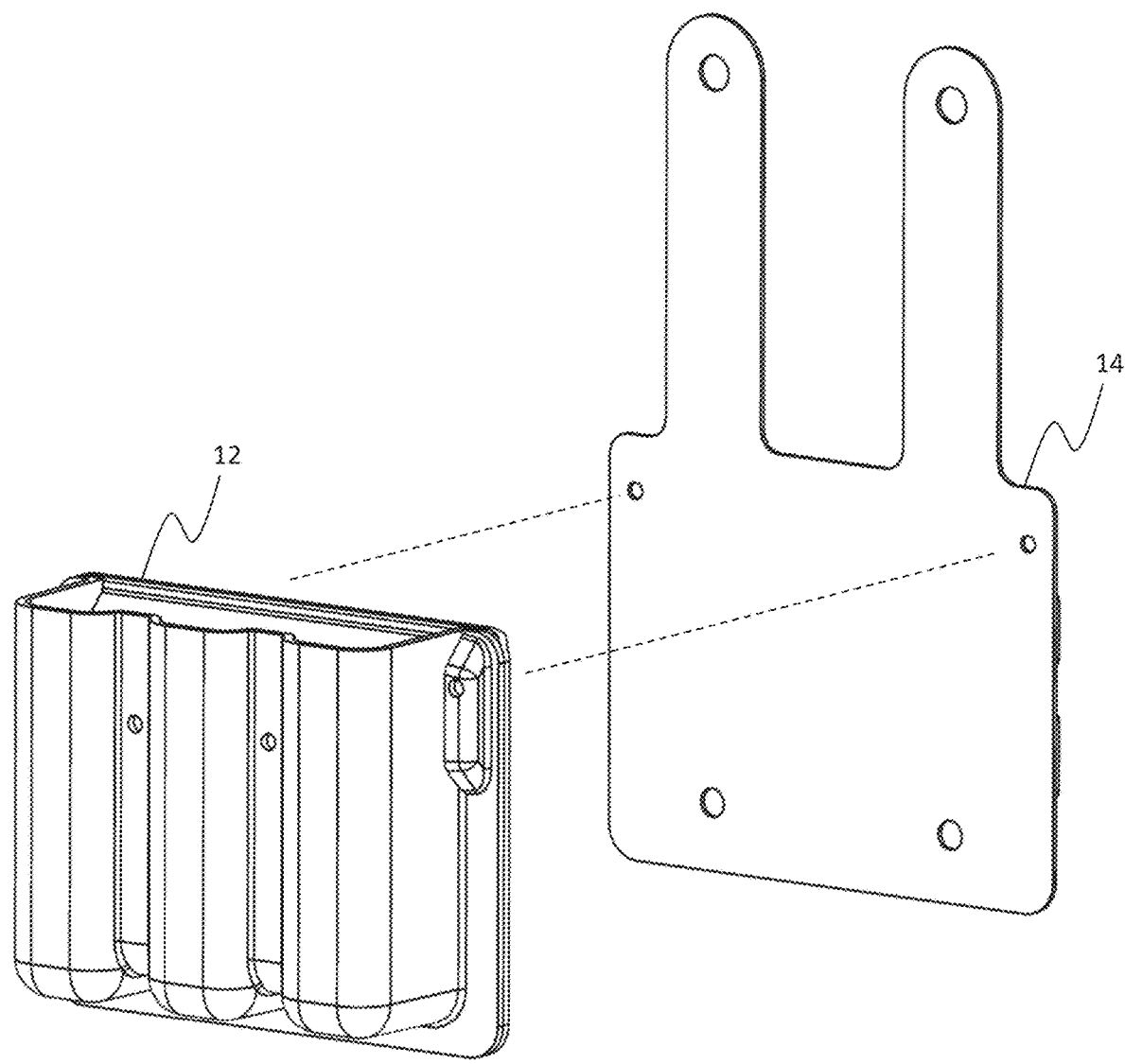
FIGS. 21 and 22 are exploded perspective views of the ammunition magazine pouch including a magazine support assembly and an attachment system.
Figure 22:
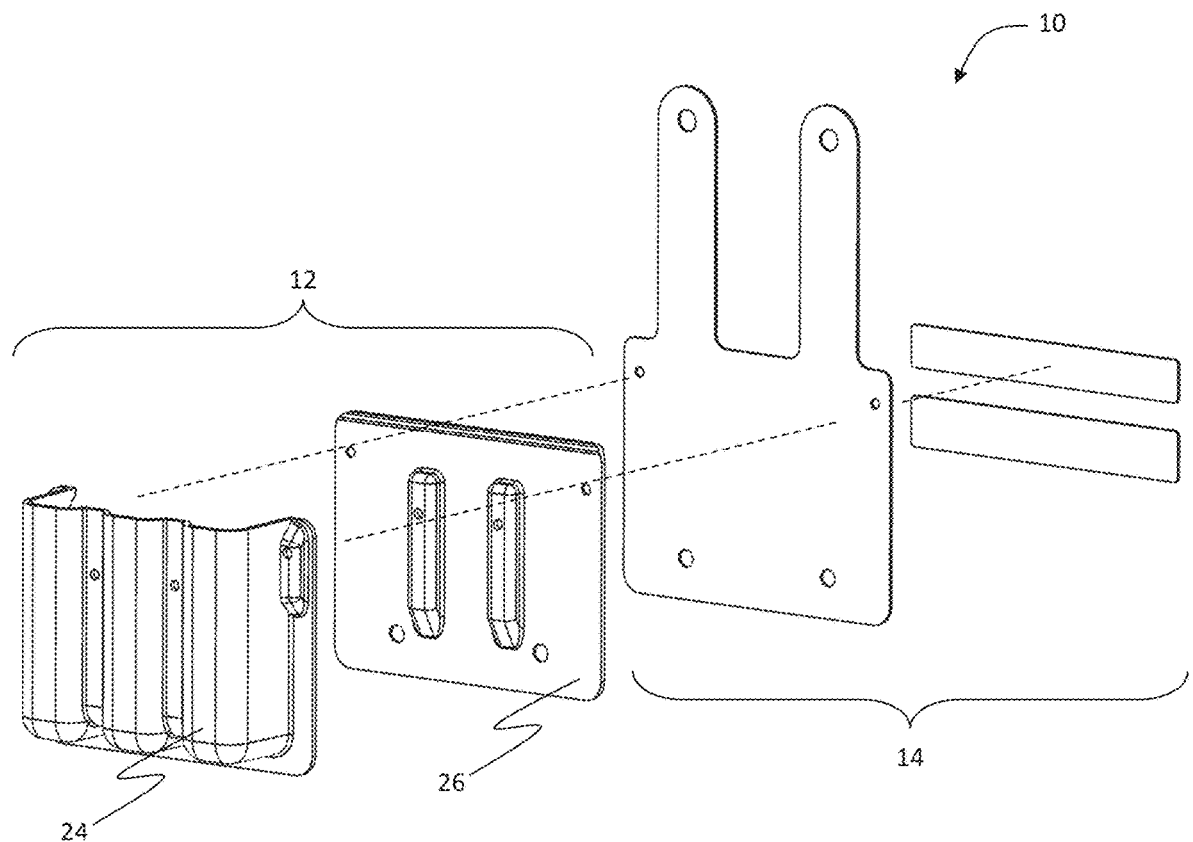
Figure 23:
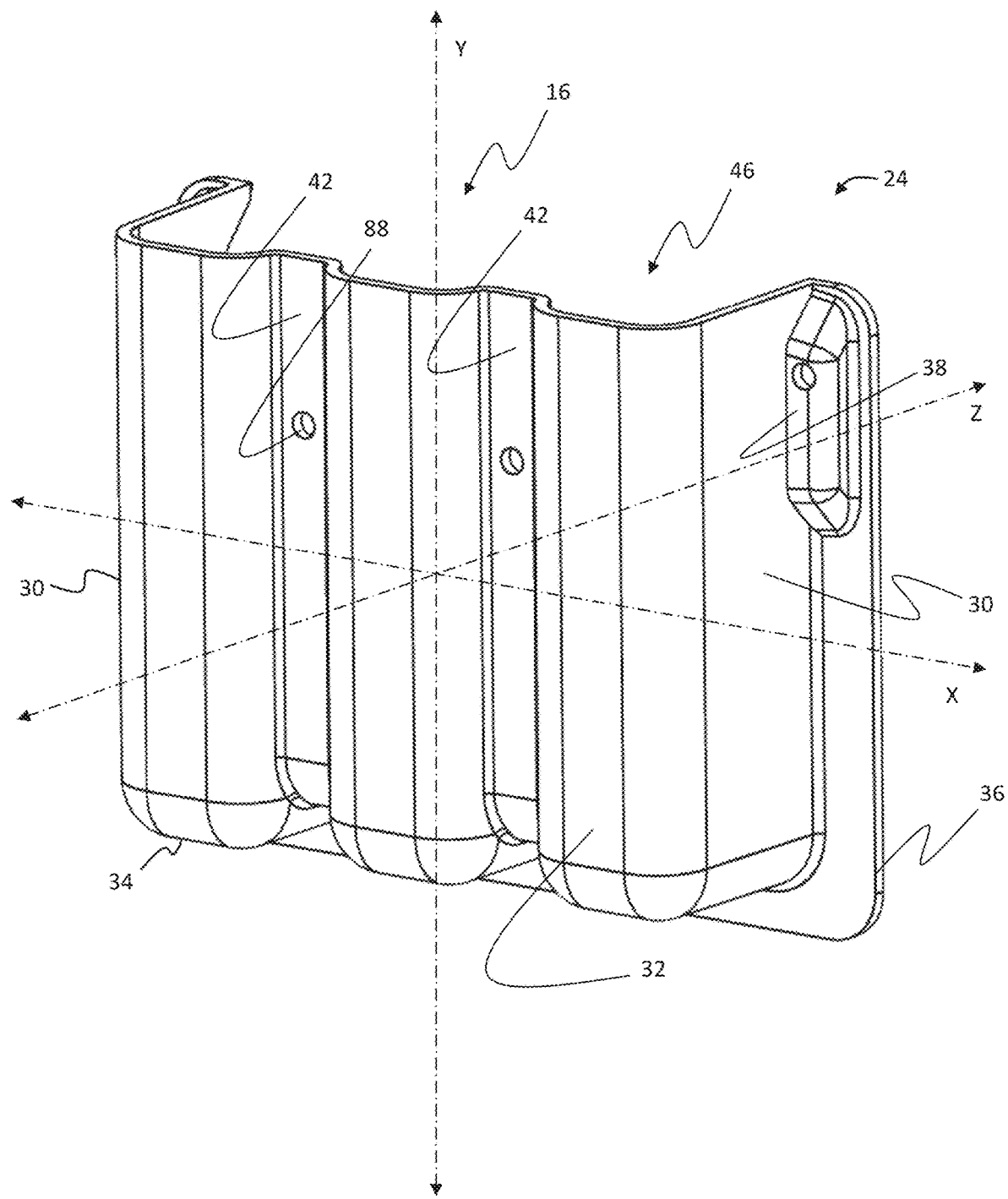
FIGS. 23-33 are perspective views of portions of the magazine support assembly including a front cover member and a back plate member.
Figure 24:
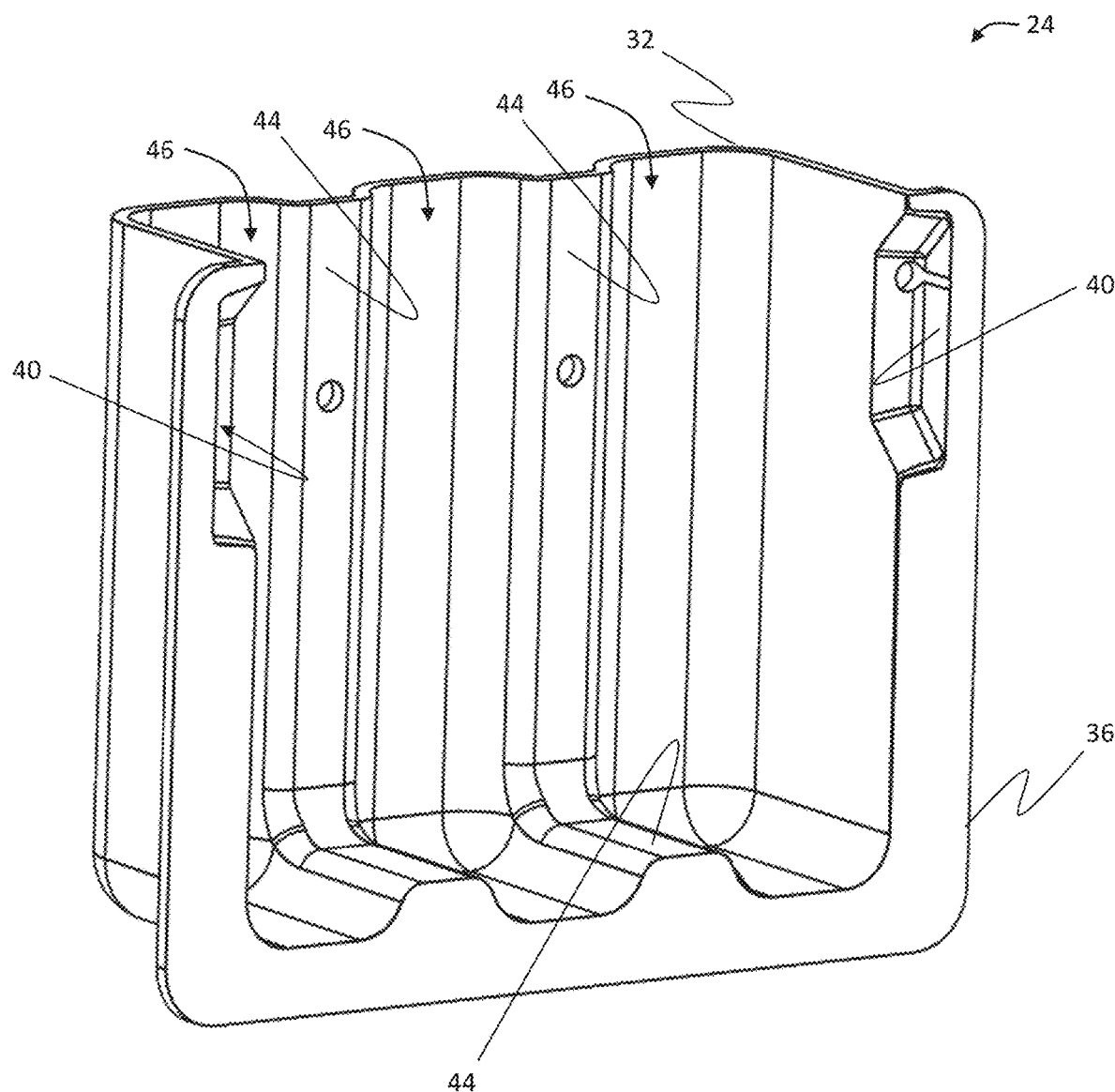
Figure 25:
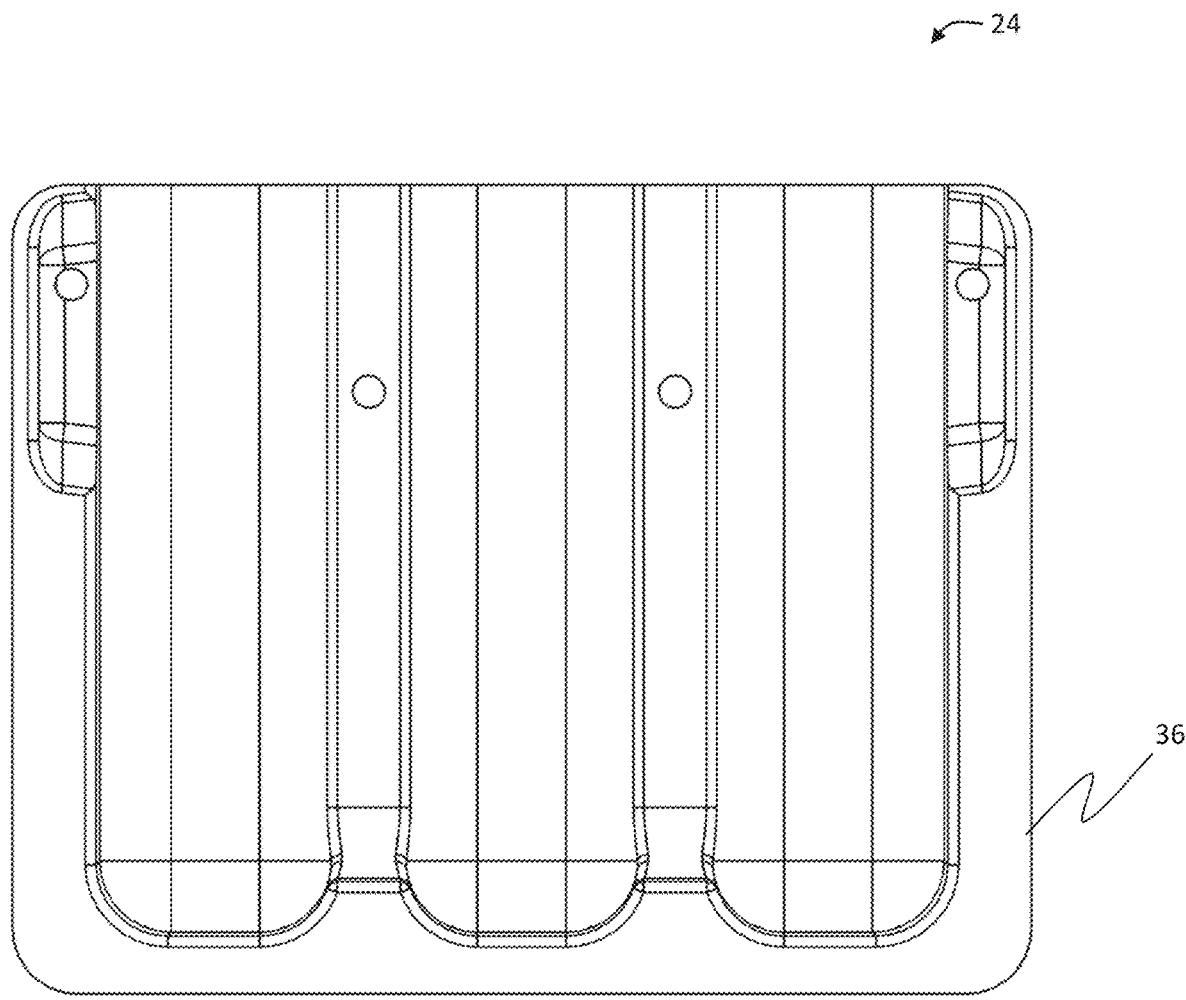
Figure 26:
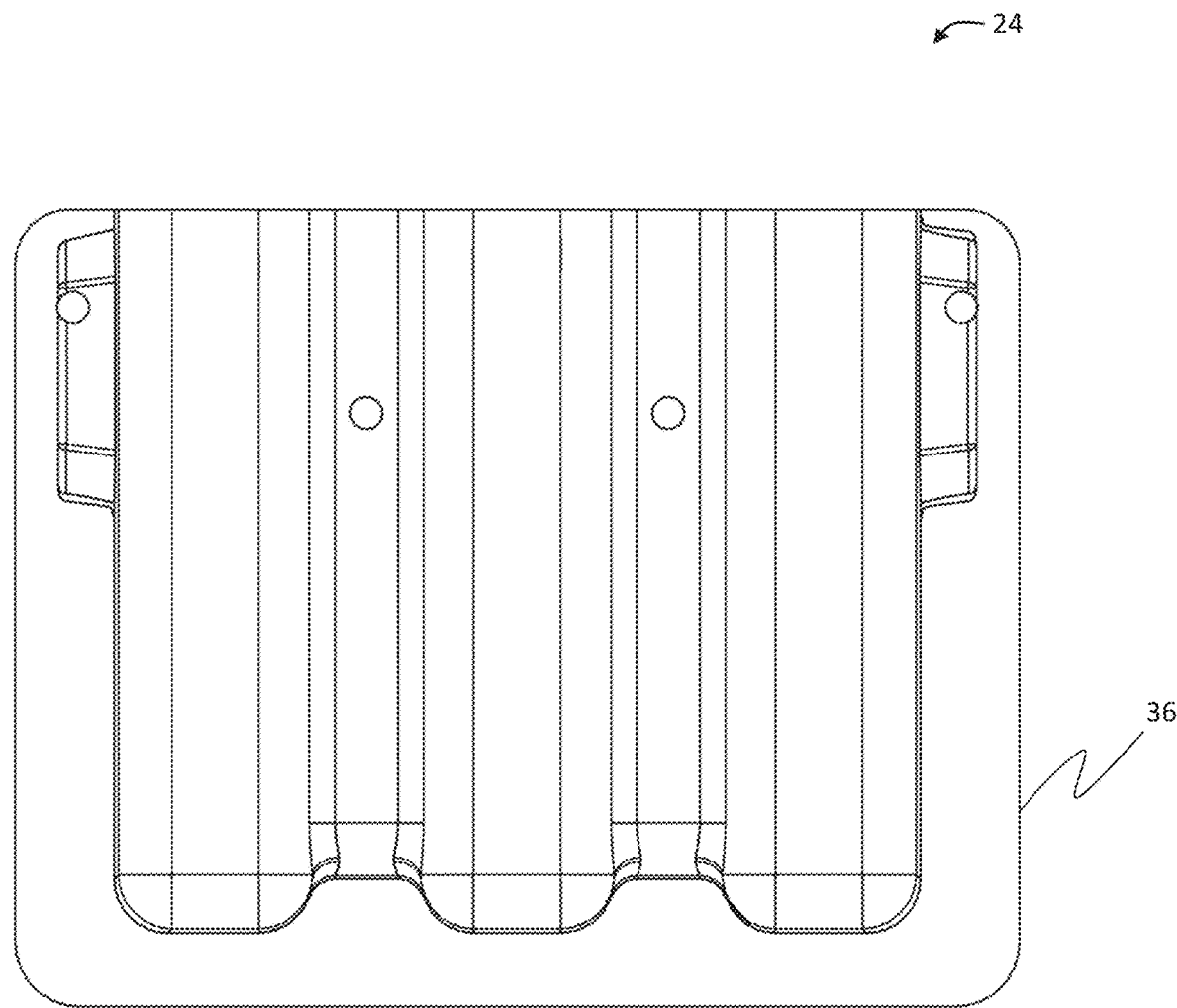
Figure 27:
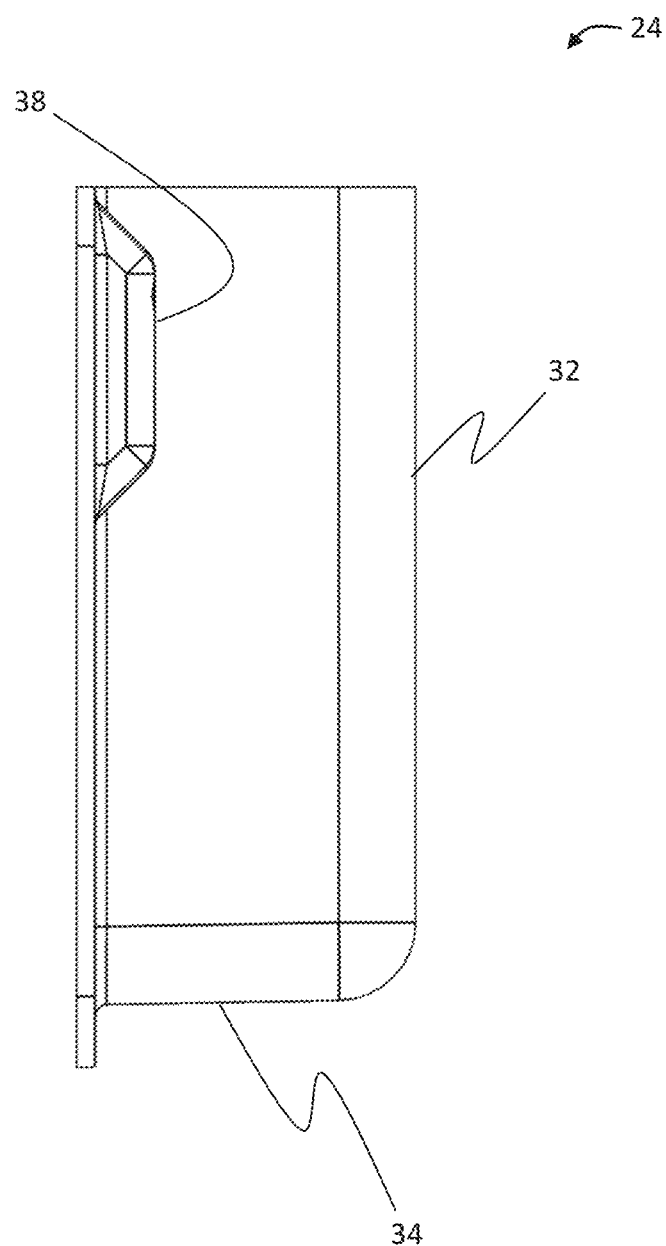
Figure 28:
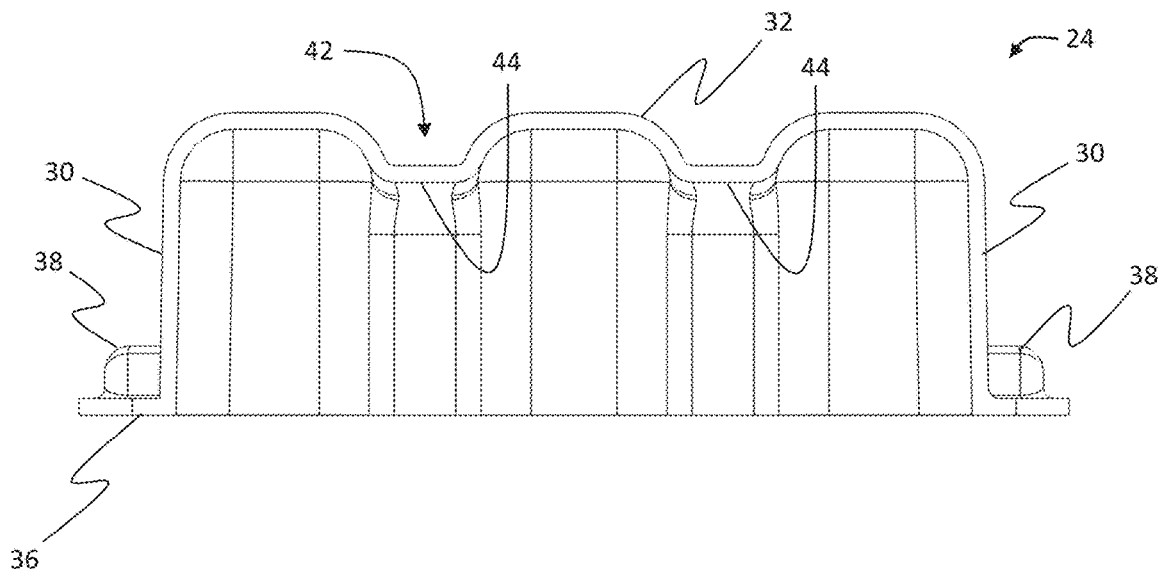
Figure 29:
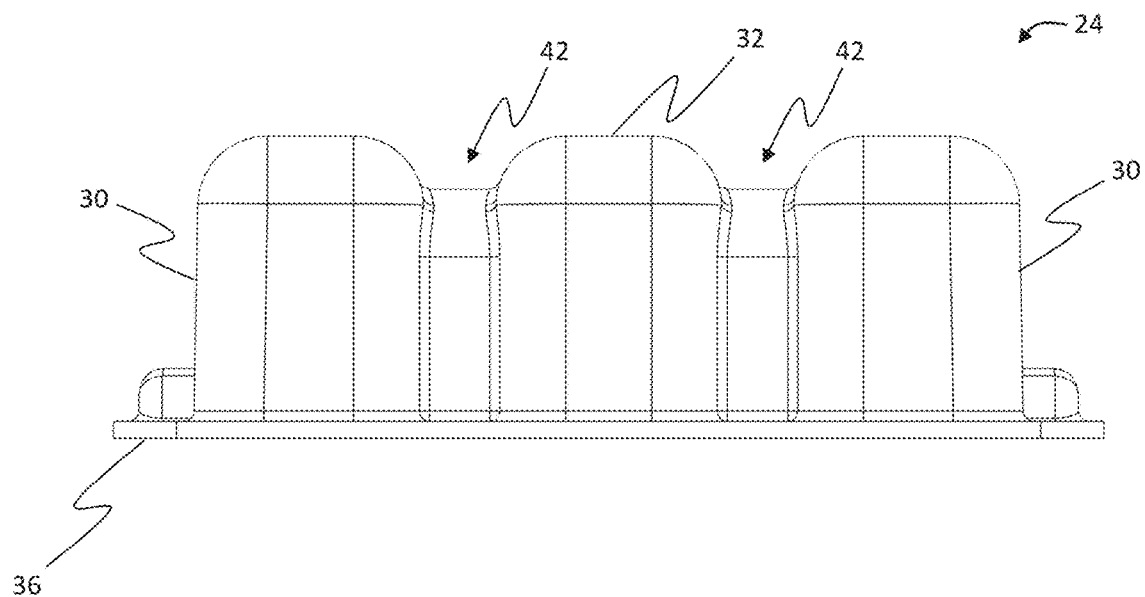
Figure 30:
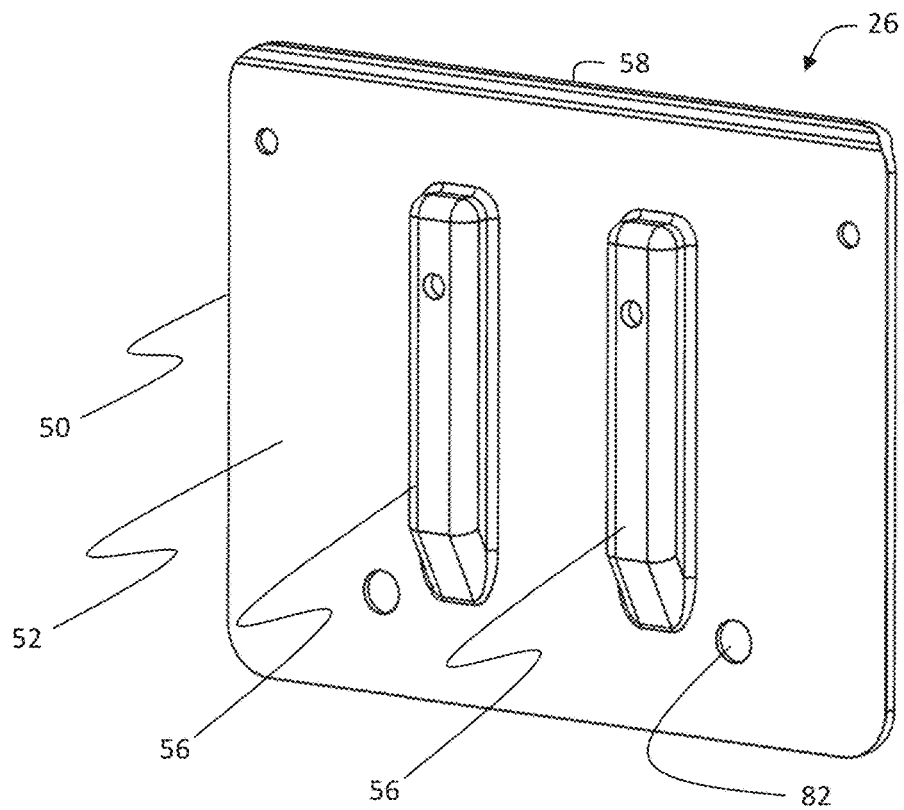
Figure 31:
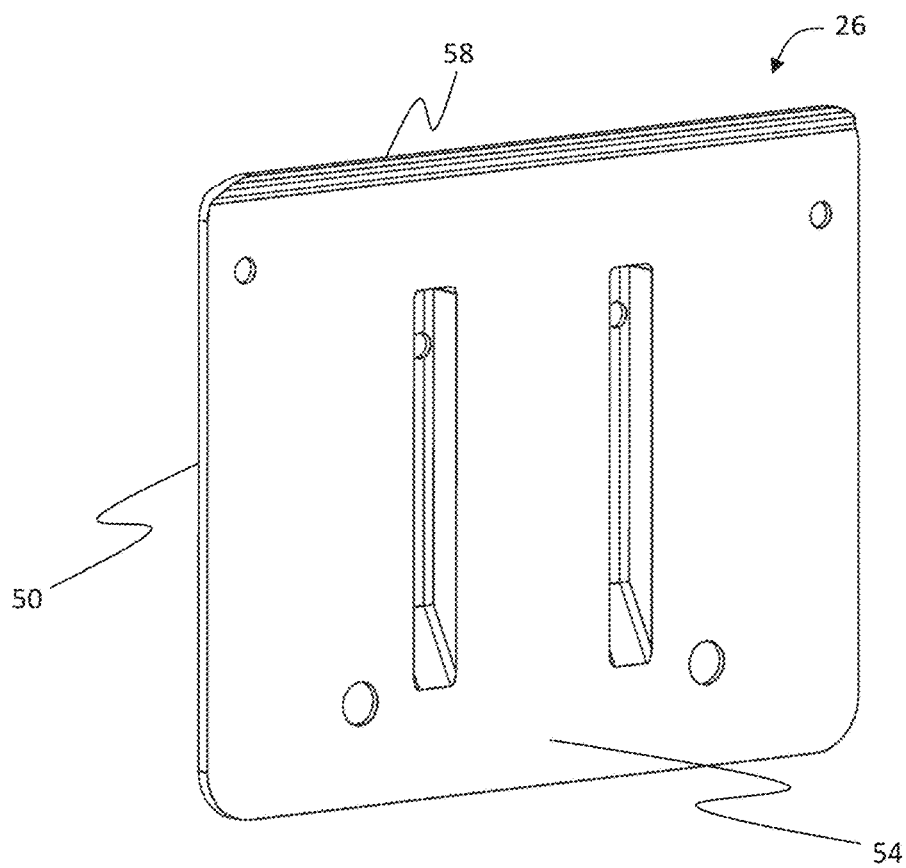
Figure 32:
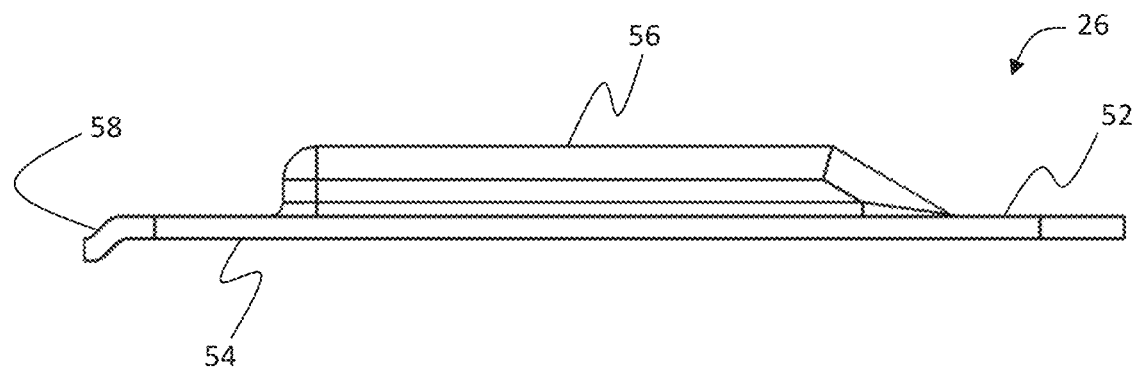
Figure 33:
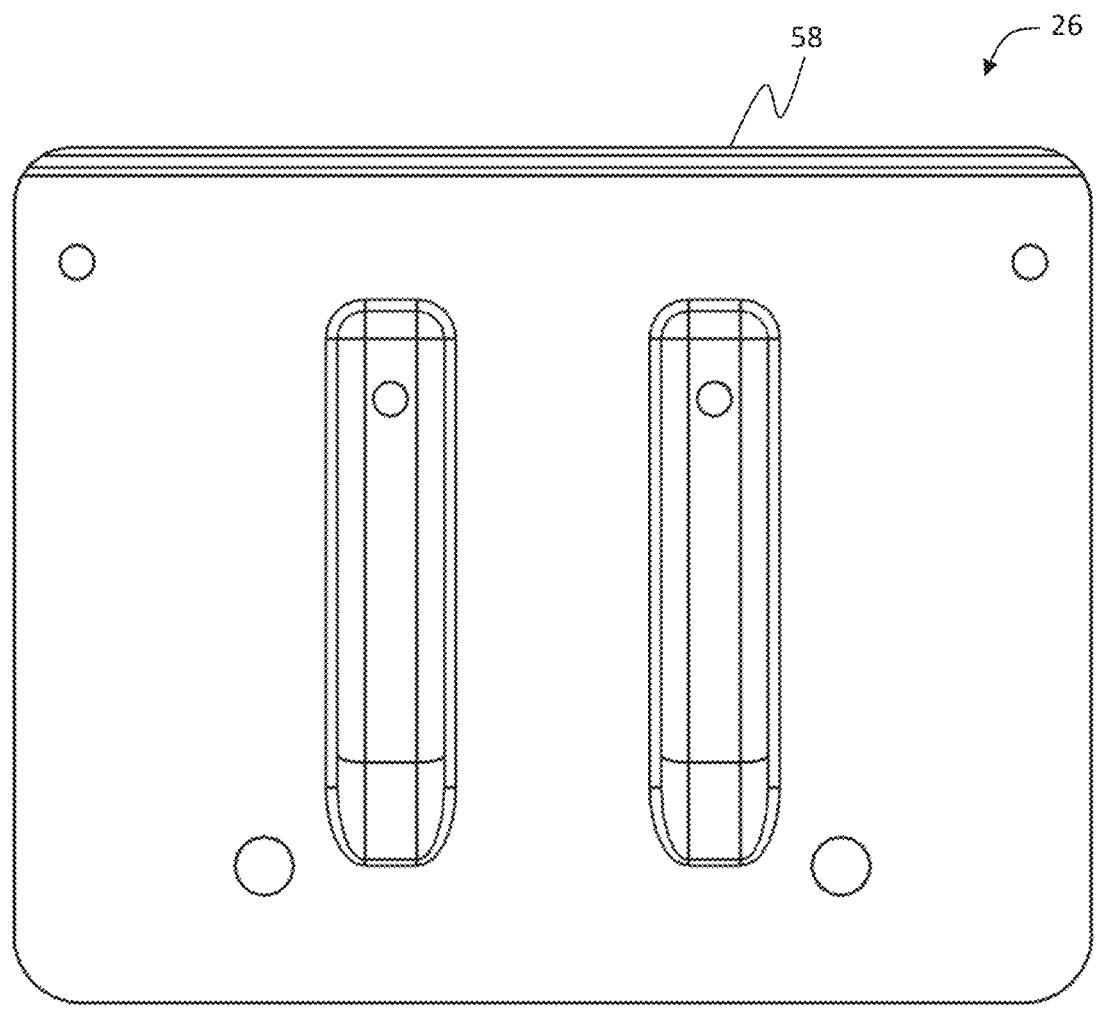
Figure 34:
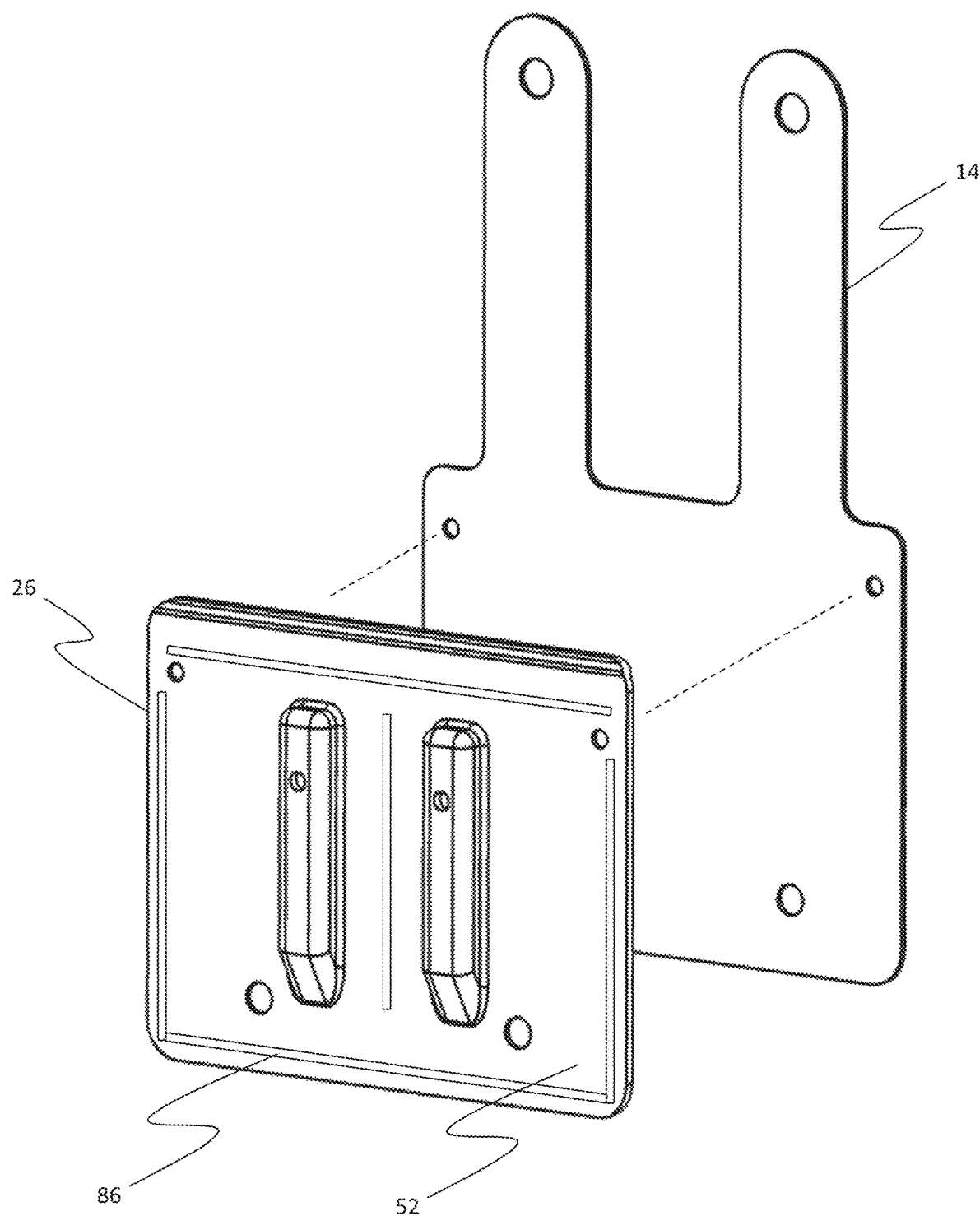
FIGS. 34-42 are perspective views of the back plate member and the attachment system.
Figure 35:
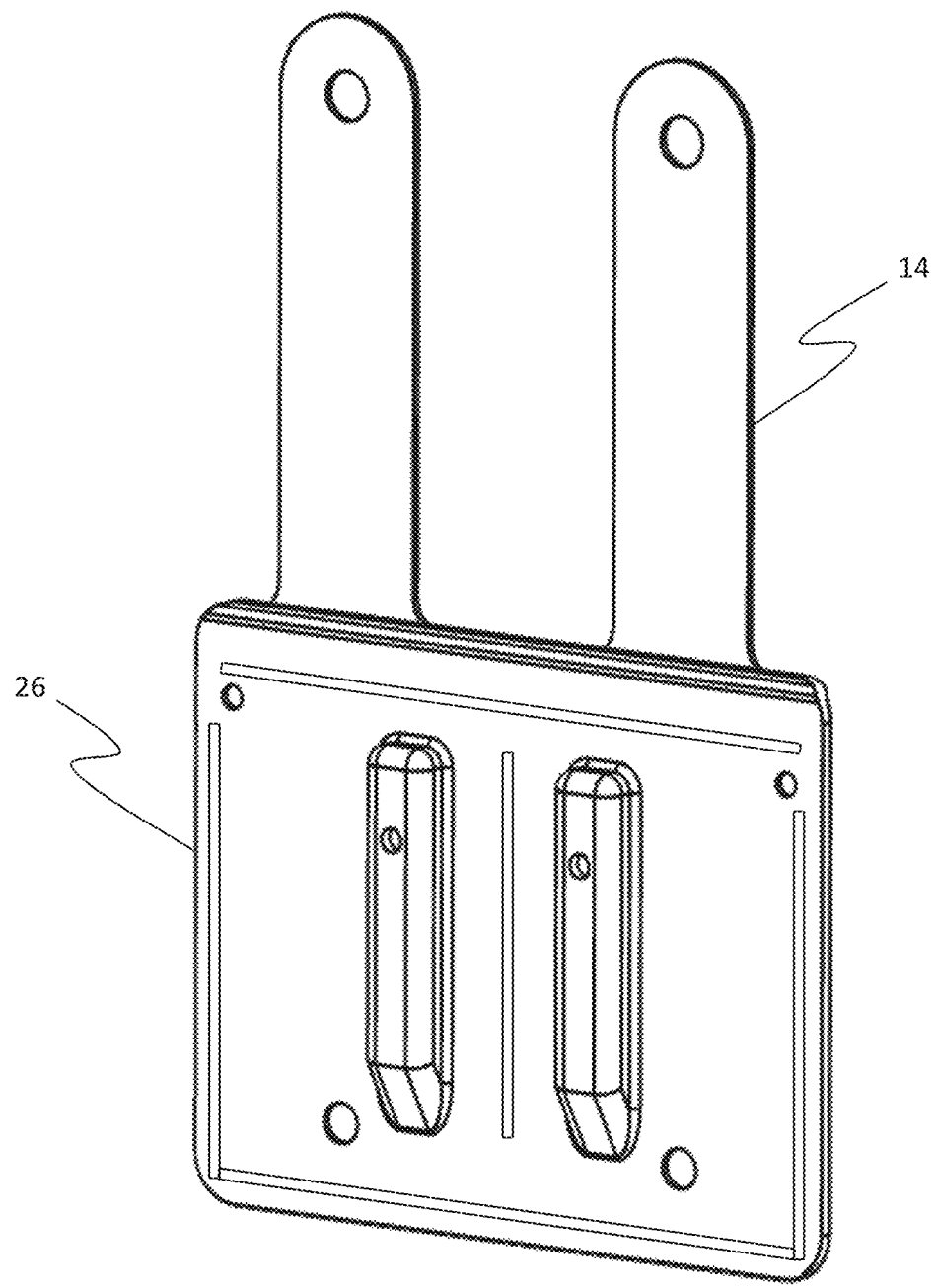
Figures 36, 37:
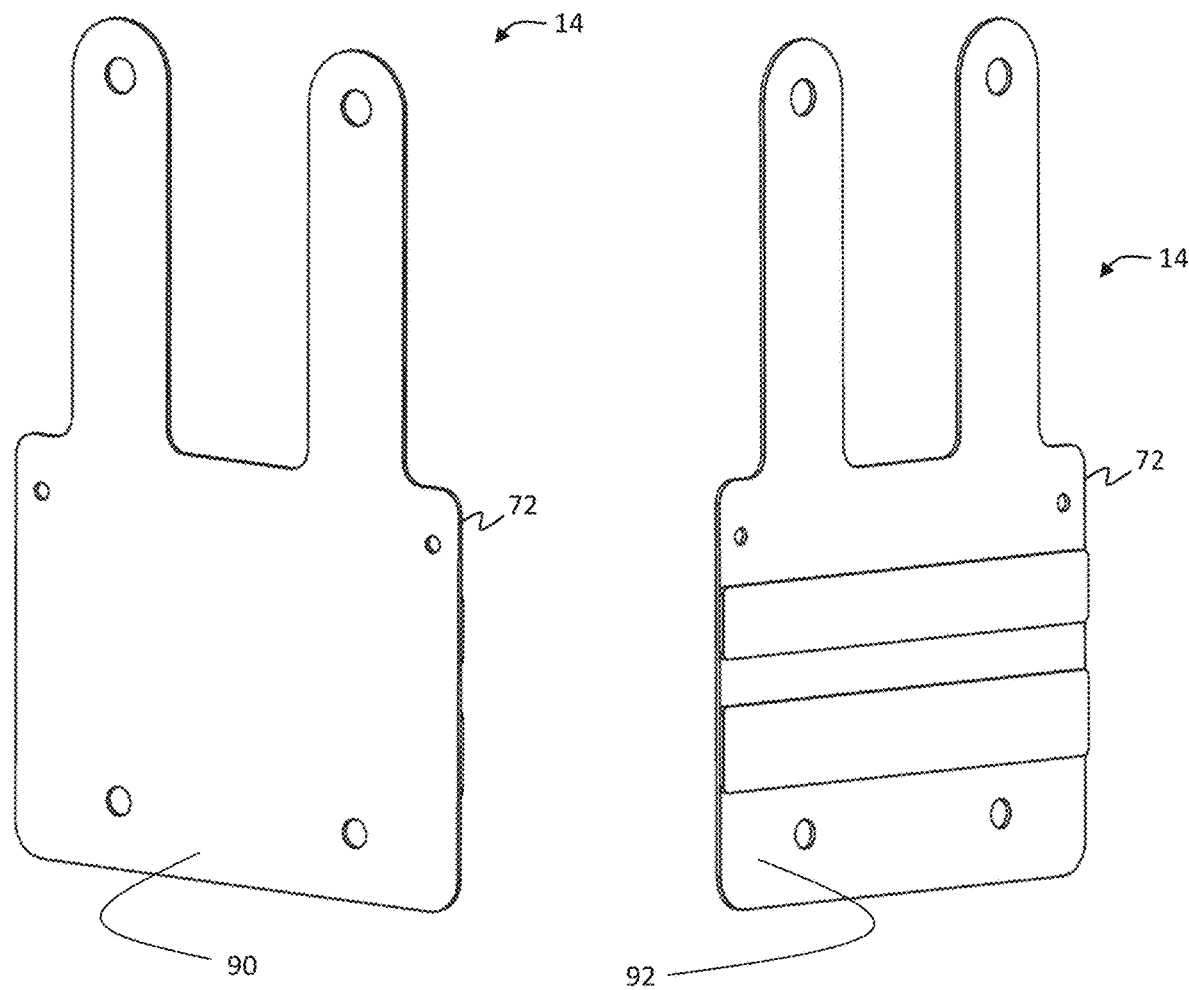
Figure 38:
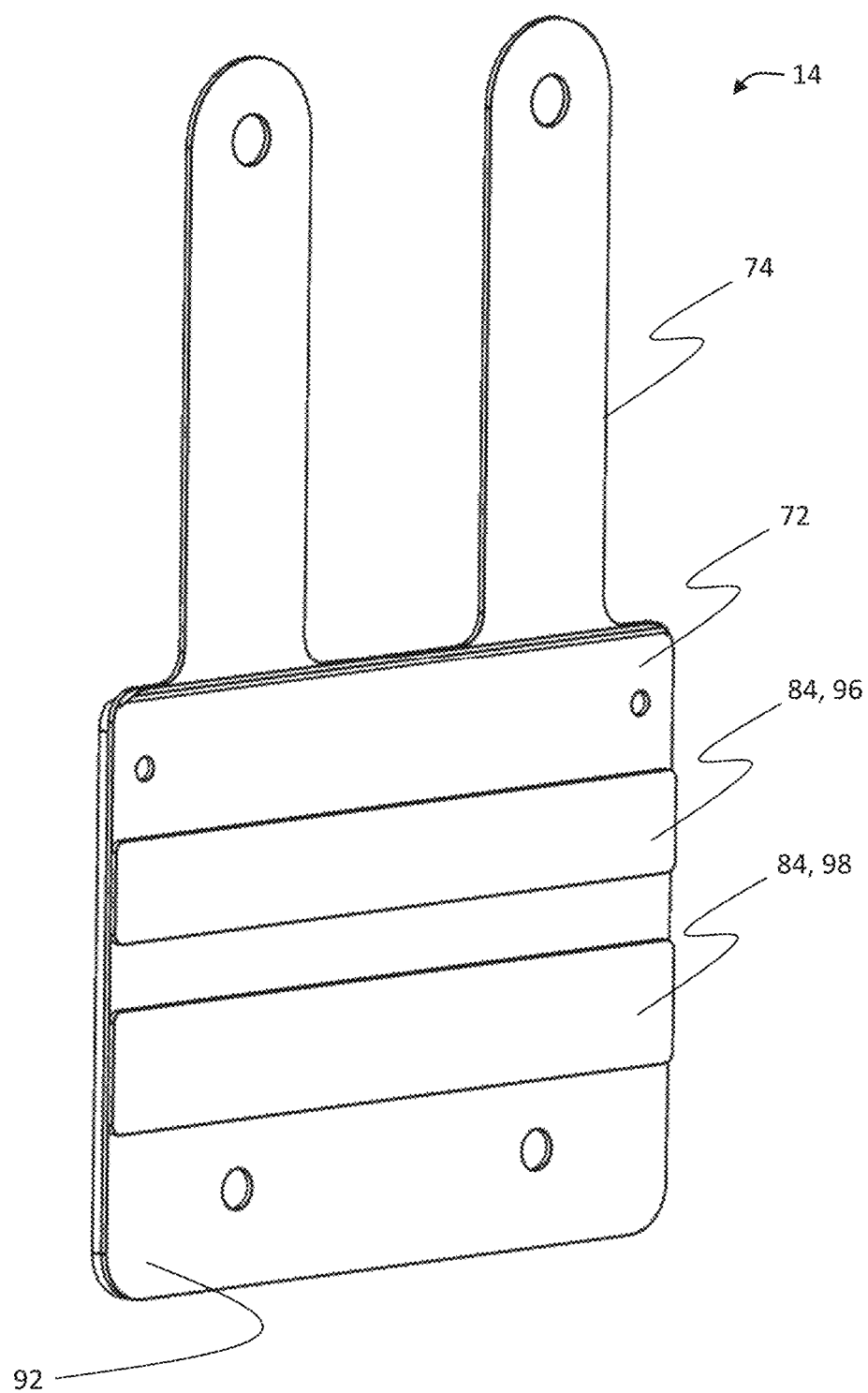
Figures 39, 40:
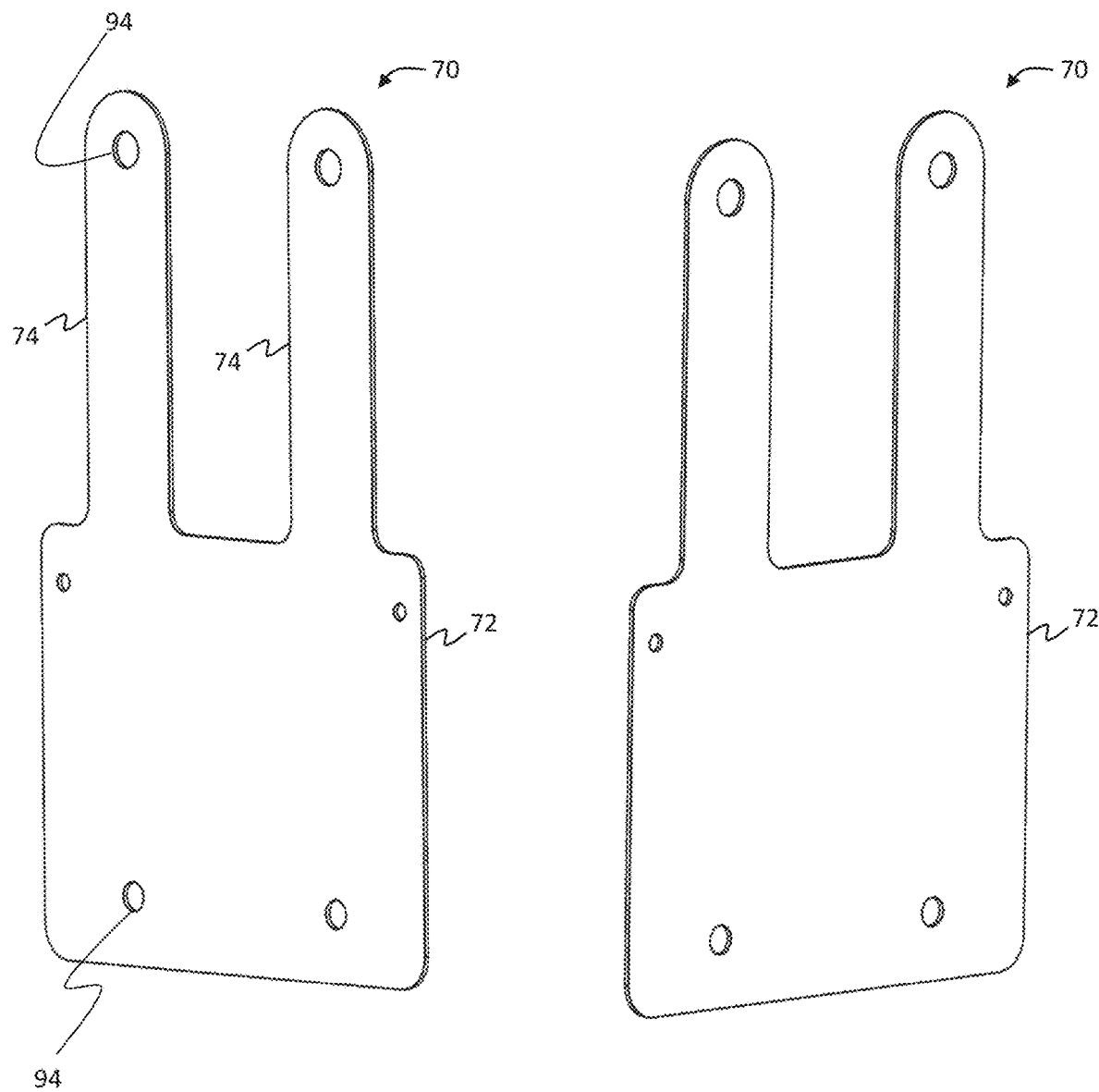
Figure 41:
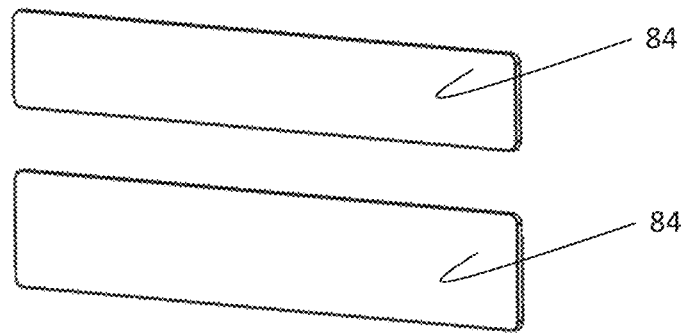
Figure 42:
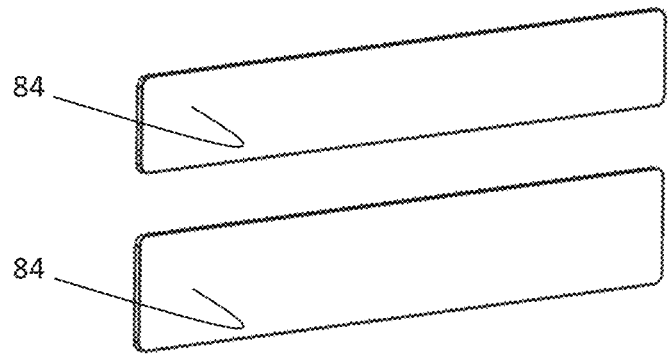
Figure 43:
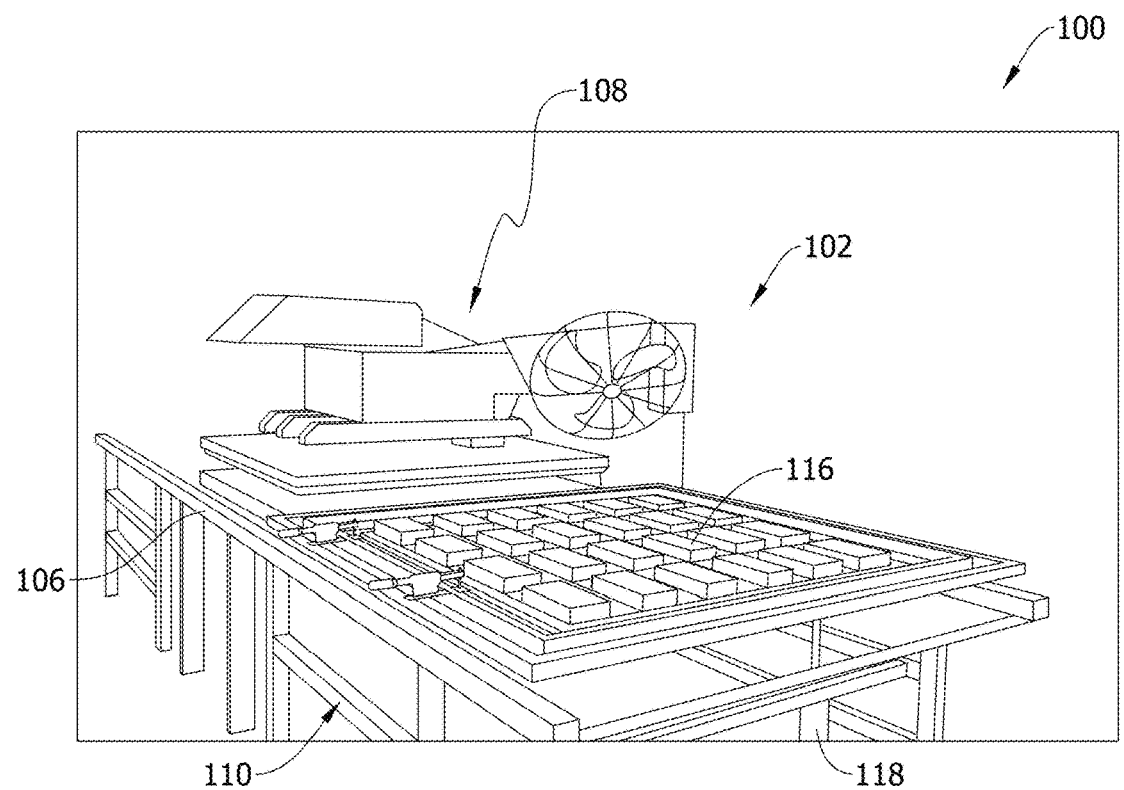
FIGS. 43-46 are perspective views of a thermoplastic machine assembly for use in manufacturing the ammunition magazine pouch, according to embodiments of the present invention.
Figure 44:
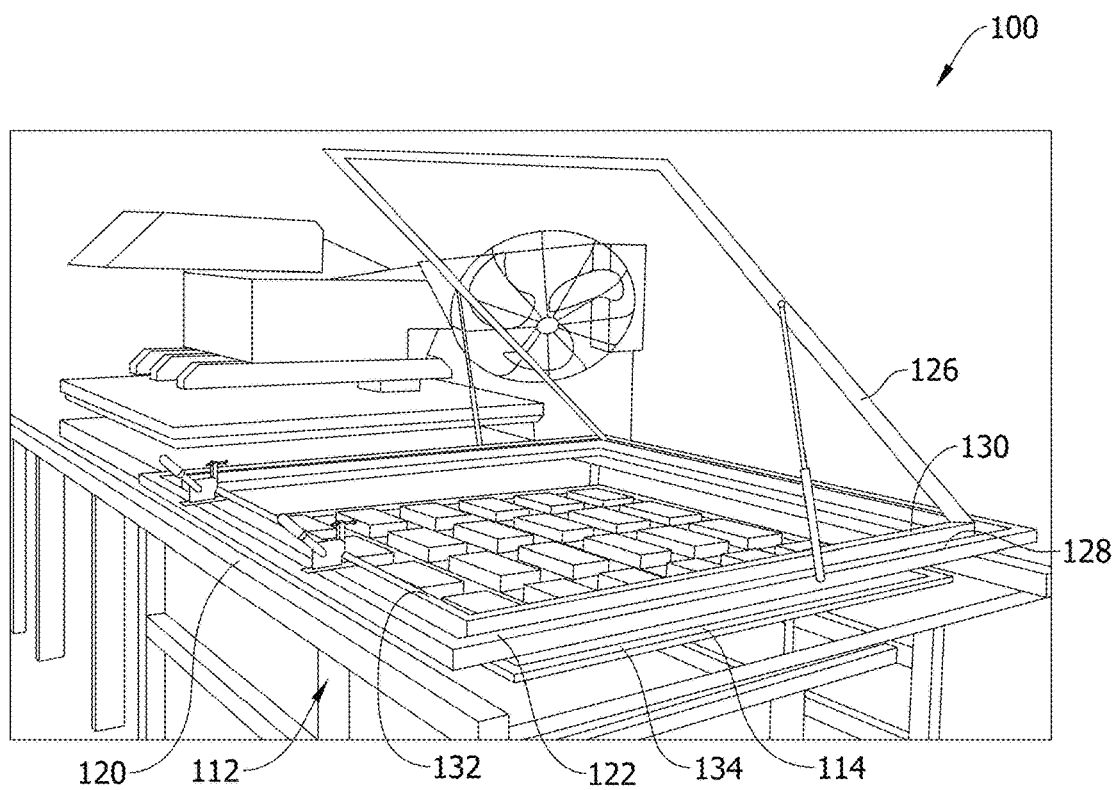
Figure 45:
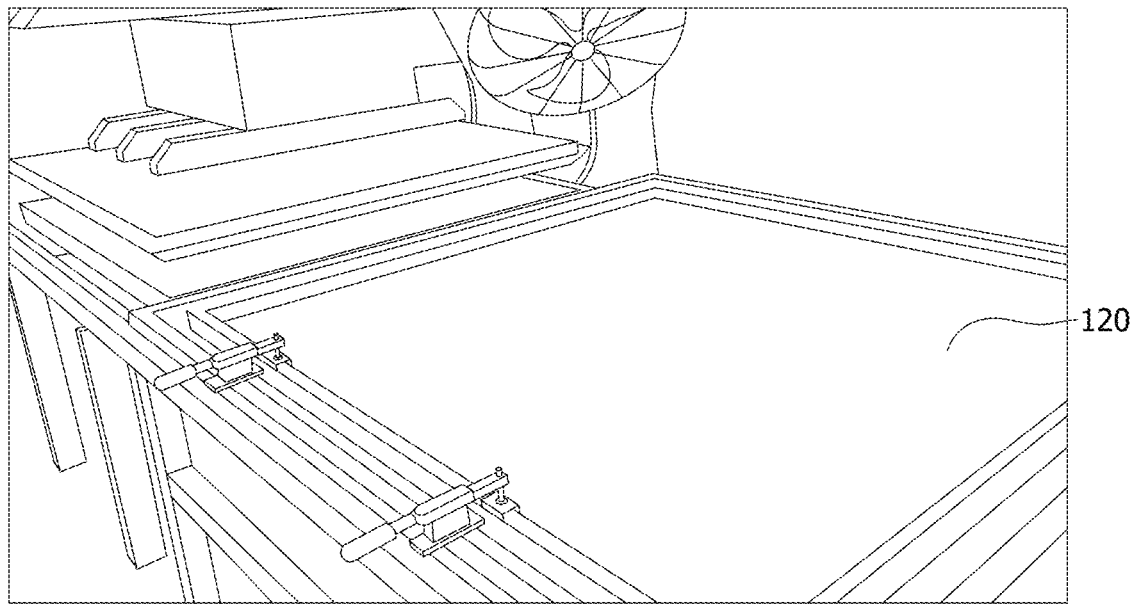
Figure 46:
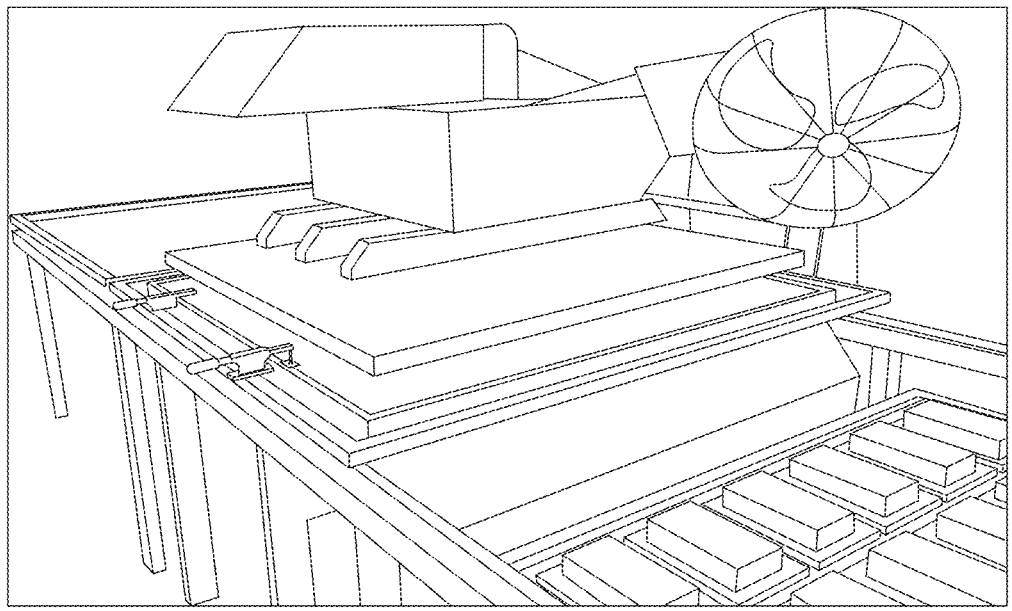
Figure 47:
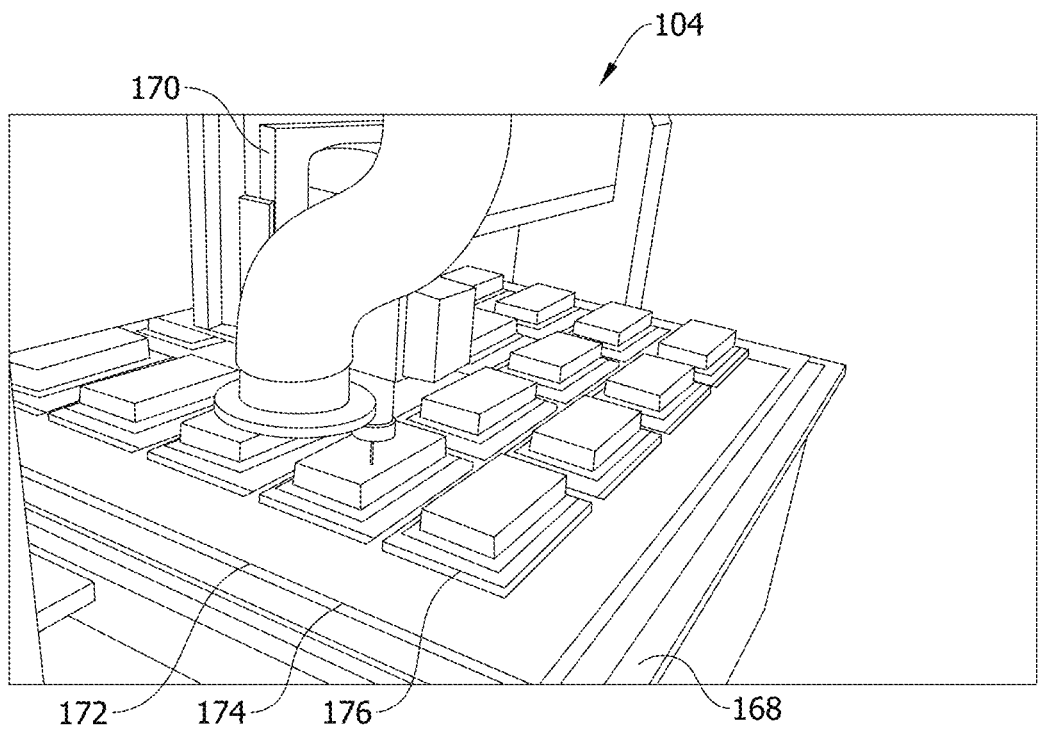
FIGS. 47-48 are perspective views of a CNC milling machine for use in manufacturing the ammunition magazine pouch, according to embodiments of the present invention.
Figure 48:
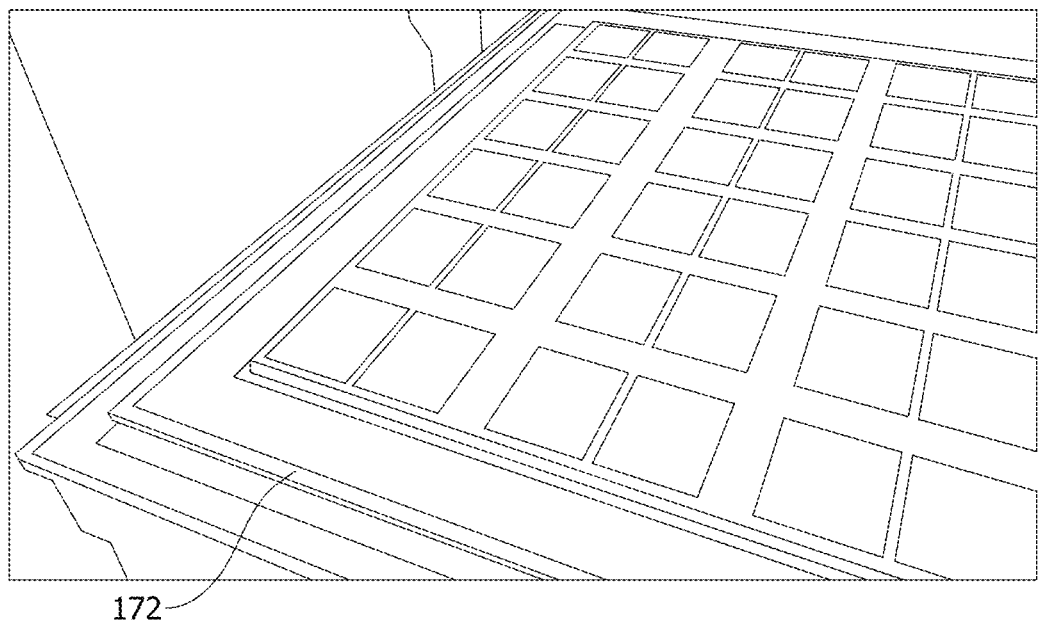
Figure 49:
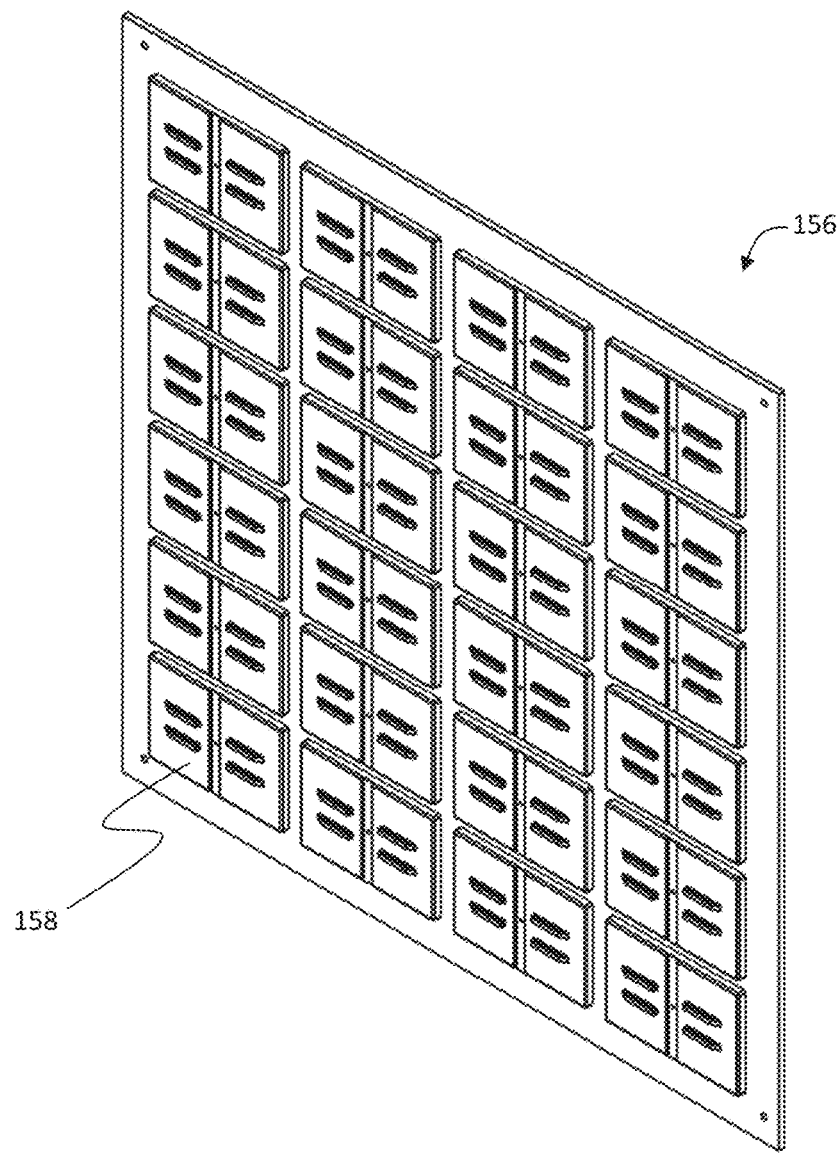
FIGS. 49-62 are perspective views of mold assemblies for use in manufacturing the ammunition magazine pouch, according to embodiments of the present invention.
Figure 50:
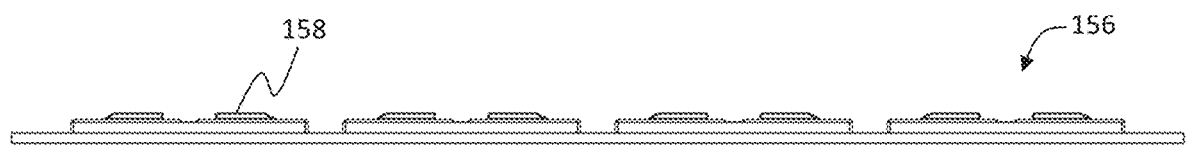
Figure 51:
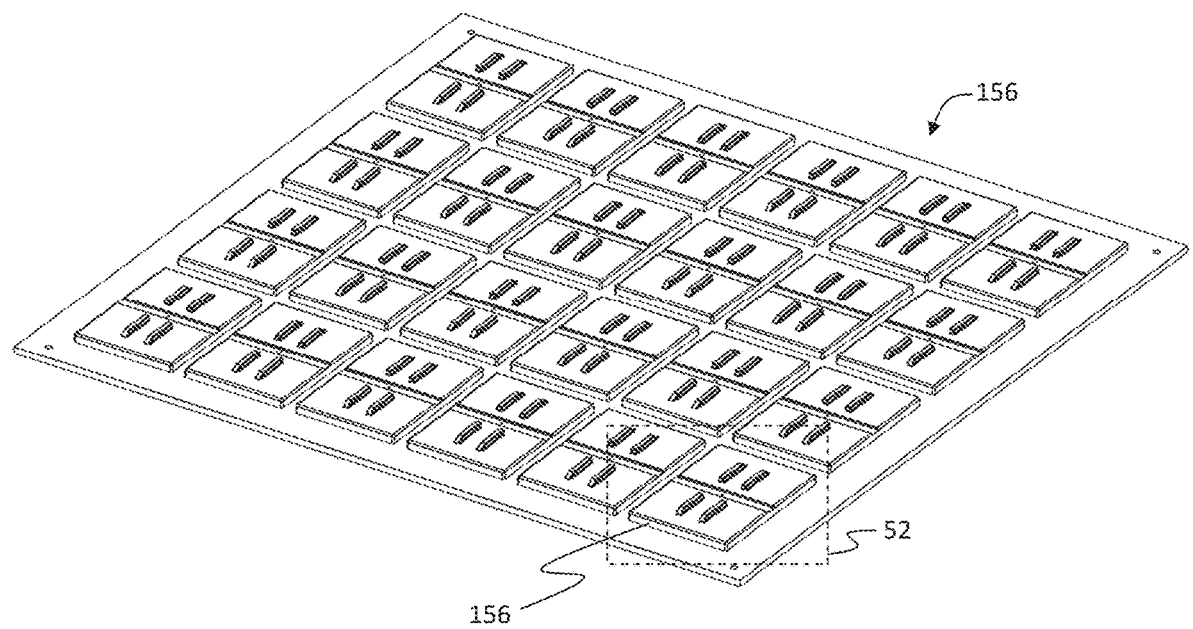
Figure 52:
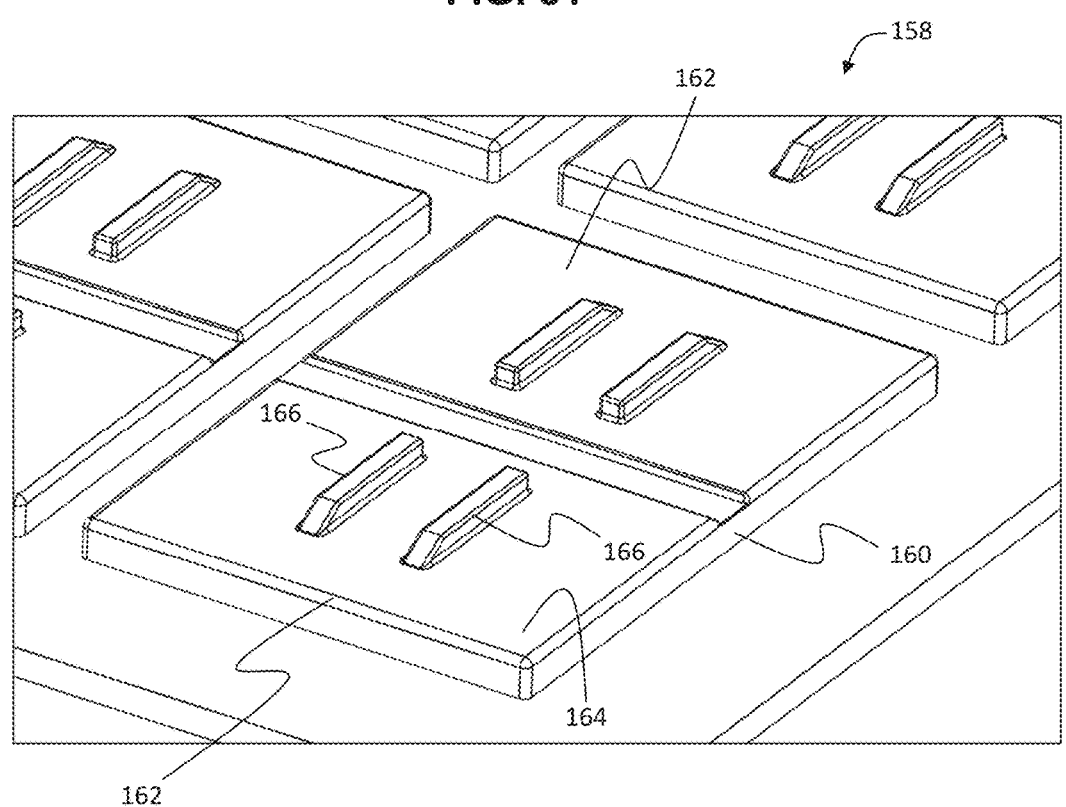
Figure 53:
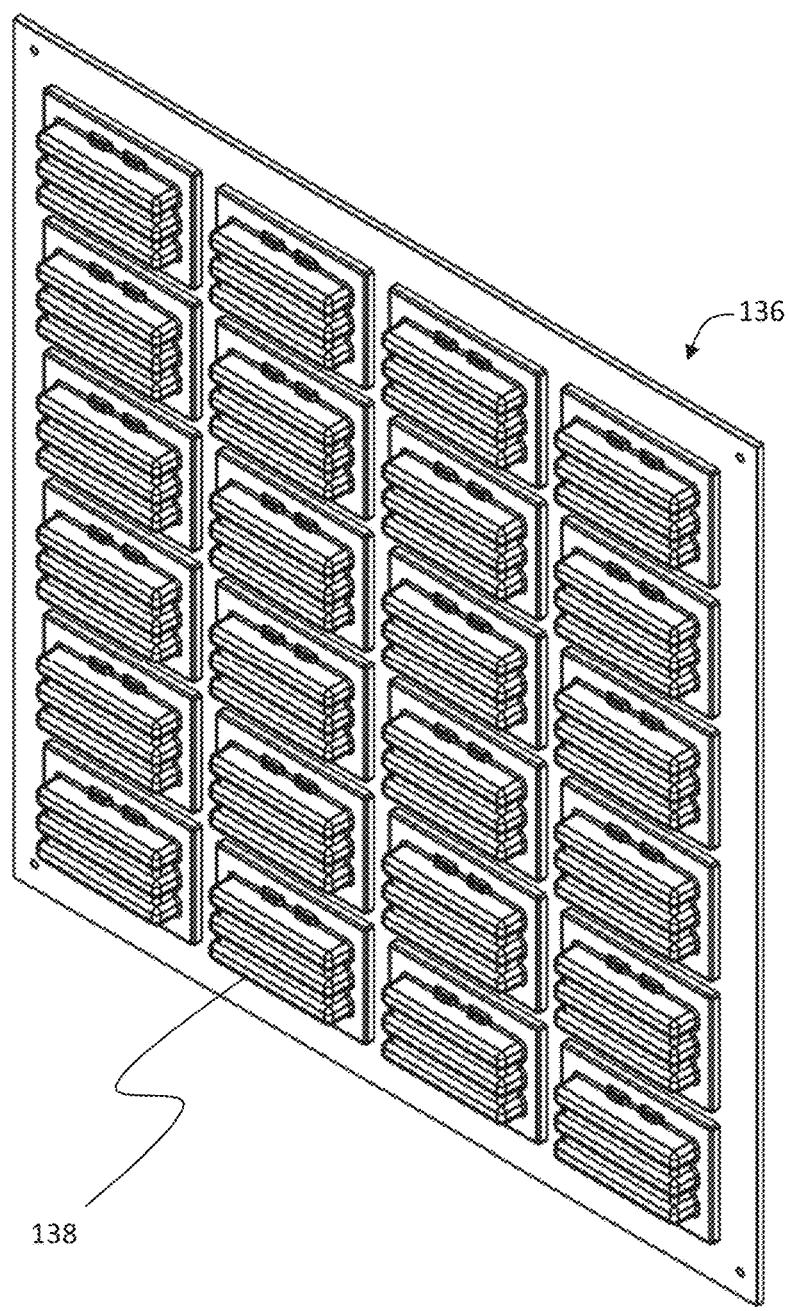
Figure 54:
Figure 55:
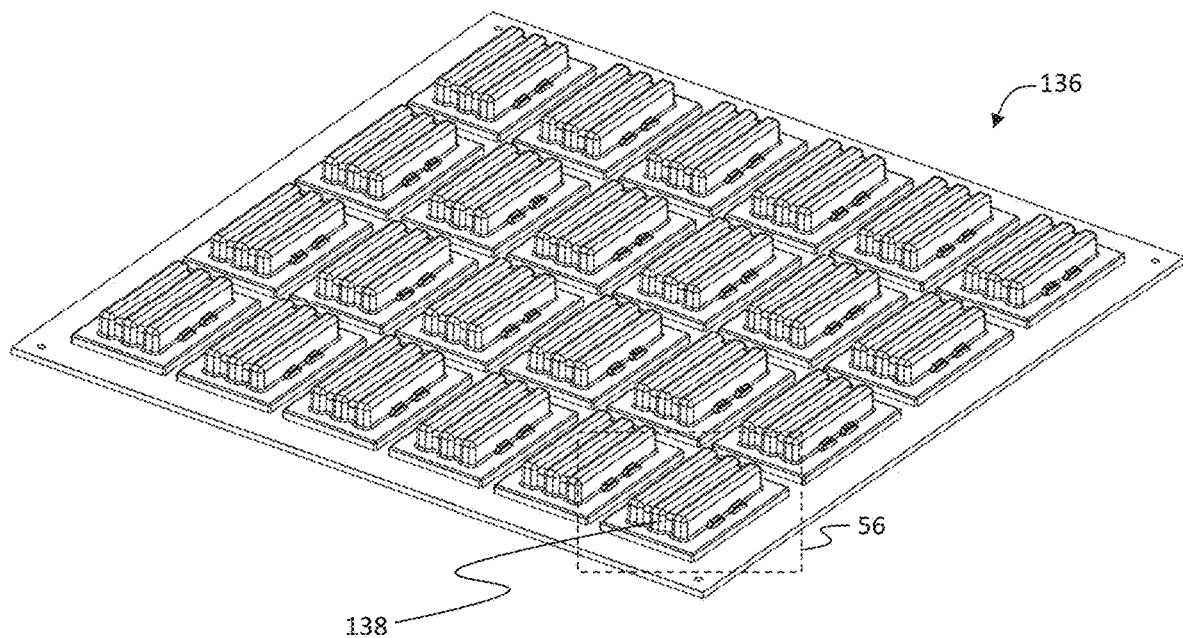
Figure 56:
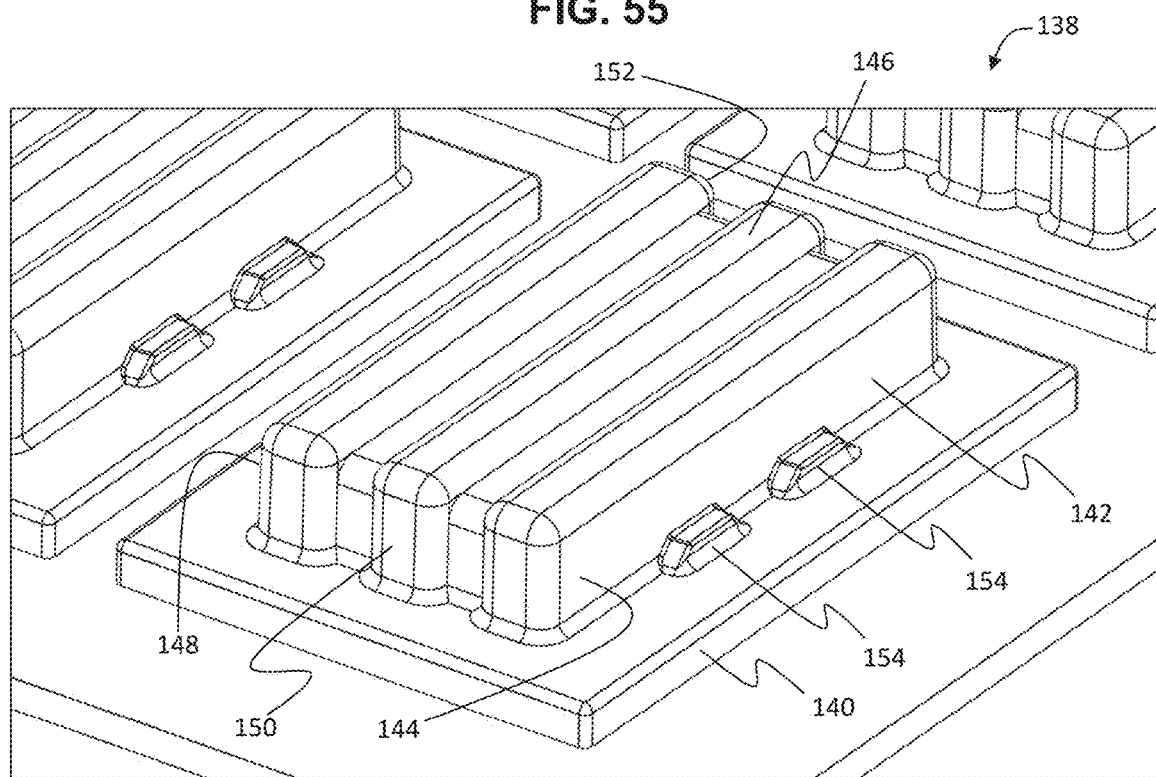
Figure 57:
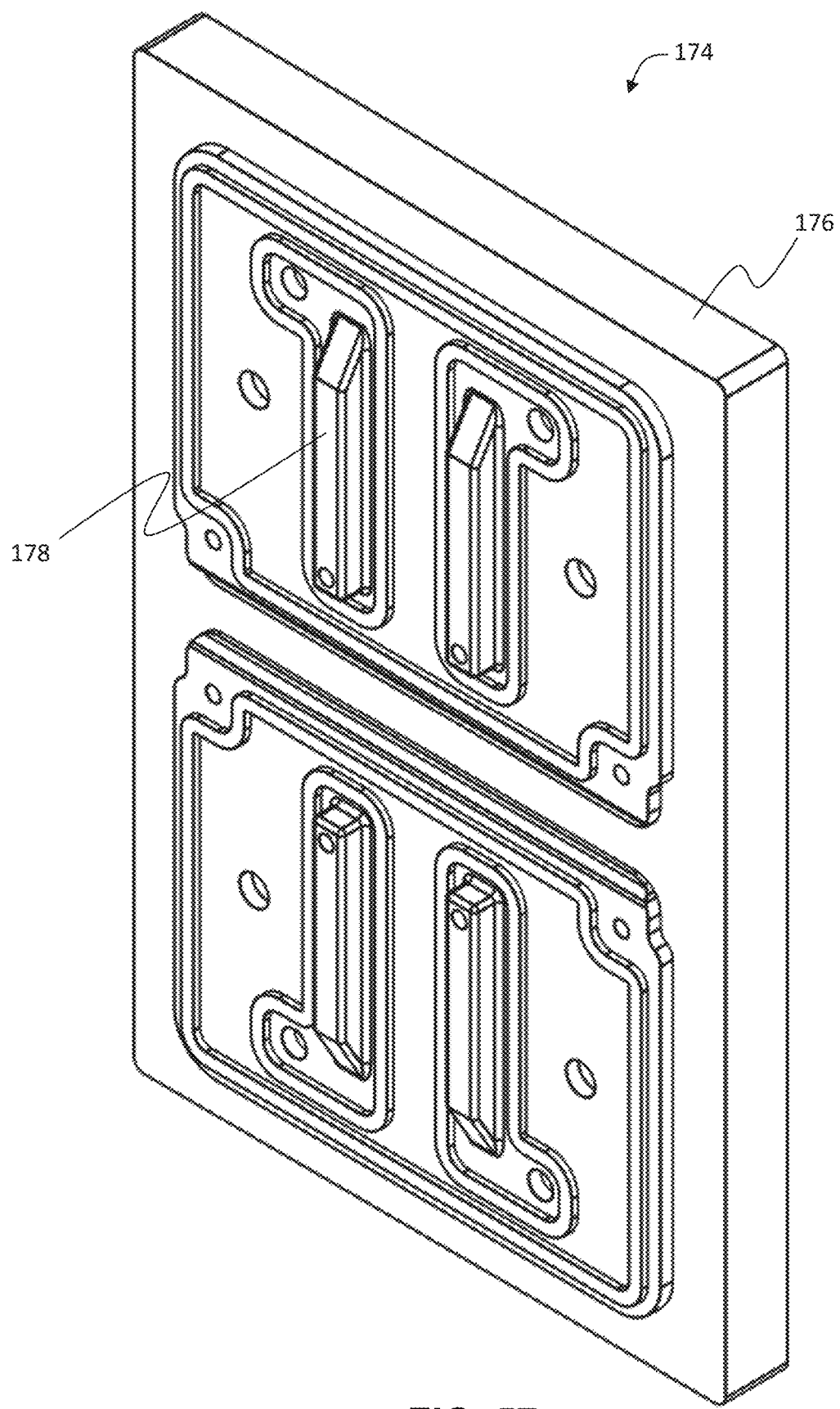
Figure 58:
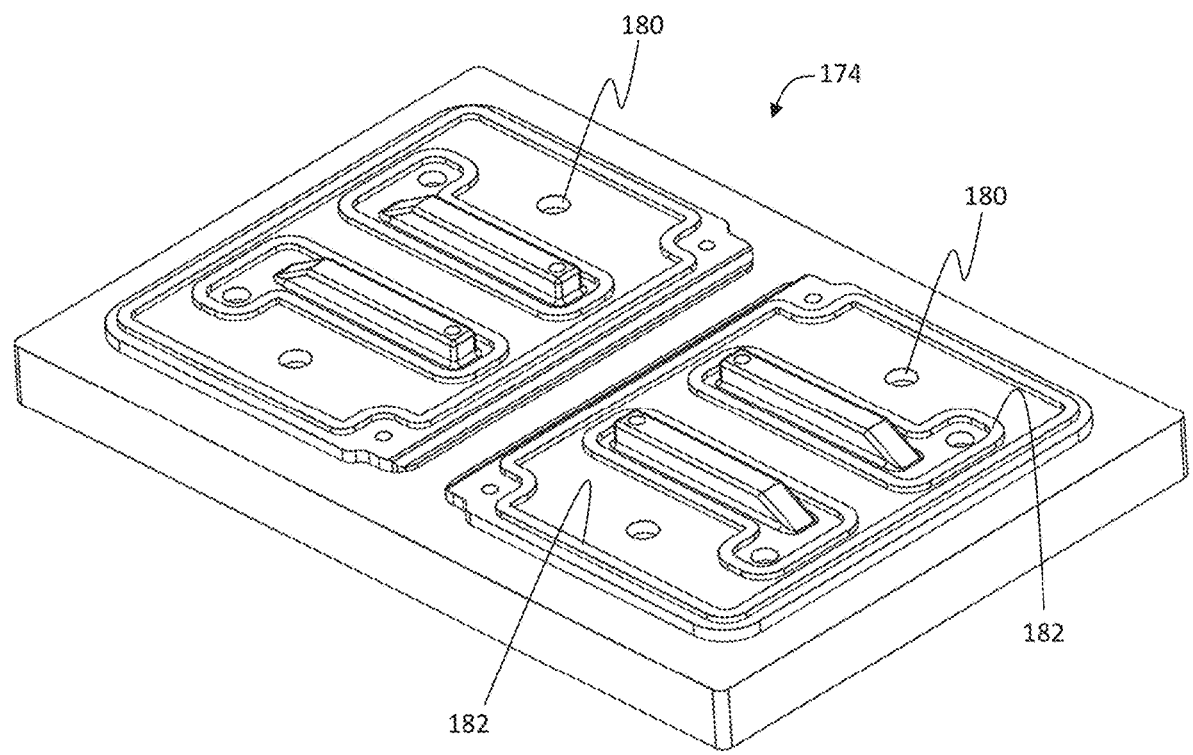
Figure 59:
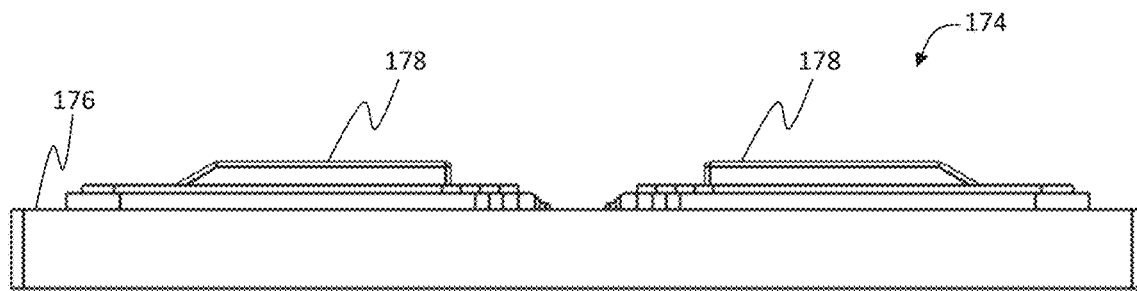
Figure 60:
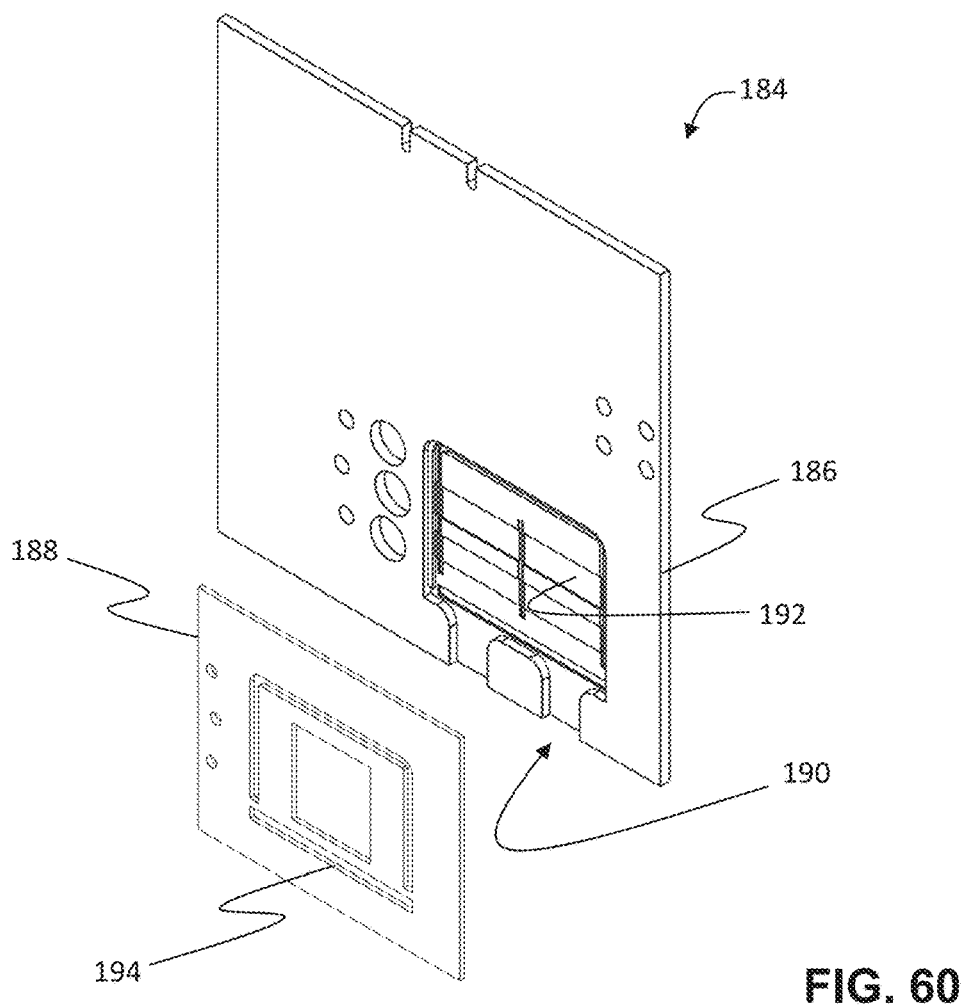
Figure 61:
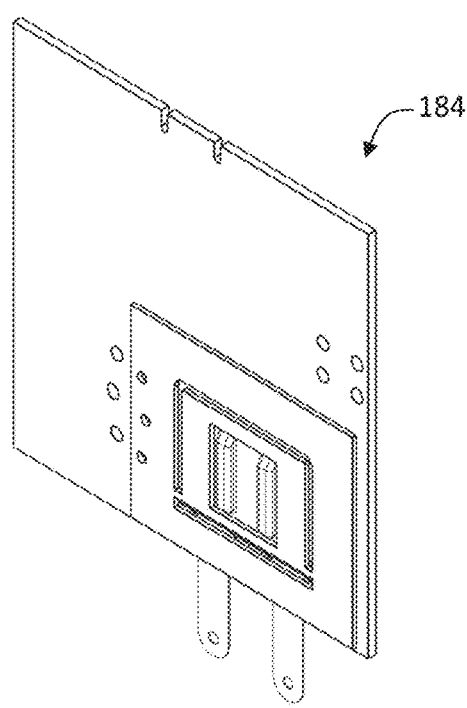
Figure 62:
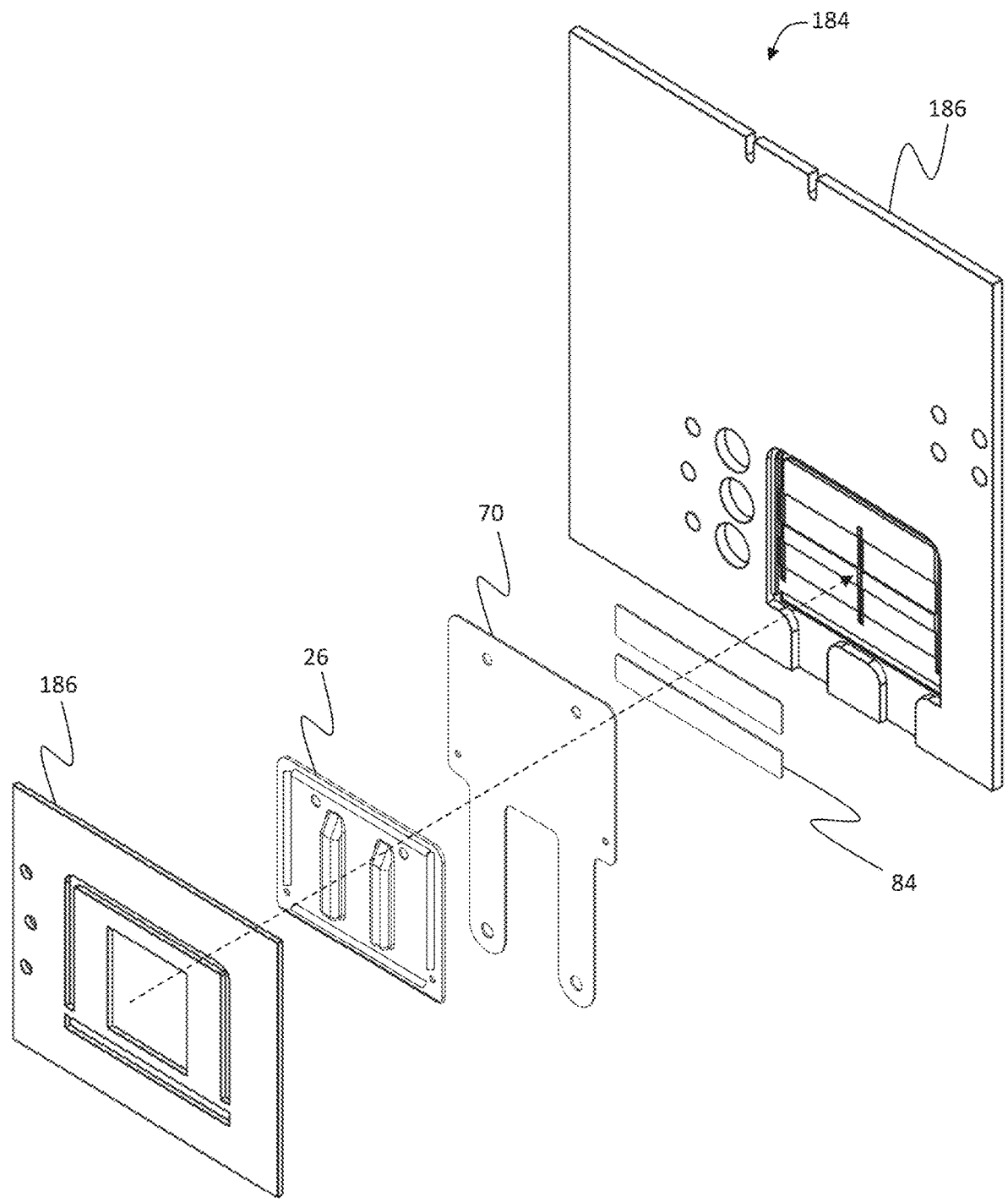

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In general, the present invention describes a tactical pouch 10 for use in securing tactical gear and ammunition magazines to traditional, mico and laser cut Molle attachment systems as well as slide on tactical and/or utility belts. For example, the tactical pouch 10 may be used to hold tactical gear such as CAT Tourniquets, telescoping batons, and/or any suitable tactical gear. The tactical pouch 10 may also be used to hold ammunition magazines such as, for example, .40, 9 mm, and .357 sig double stack magazines, AR15 magazines, and/or any suitable ammunition magazine.

Referring to FIGS. 1A-42, in the illustrated embodiment, the present invention includes an ammunition magazine pouch 10 that includes a magazine support assembly 12 and an attachment system 14. The magazine support assembly 12 includes an interior surface that defines a magazine chamber 16 extending between an open top end 18 and a closed bottom end 20. The magazine chamber 16 is sized and shaped to receive at least one ammunition magazine 22 therein. The magazine support assembly 12 includes a front cover member 24 including an inner surface defining a portion of the magazine chamber 16, a back plate member 26 coupled to the front cover member 24 to define the magazine chamber 16 therebetween, and a tensioning assembly 28 coupled to the front cover member 24 and the back plate member 26. The tensioning assembly 28 is configured to adjust a distance between an upper portion of the front cover member 24 and an upper portion of the back plate member 26 to adjust a width of the open top end of the magazine chamber 16. In some embodiments, the ammunition magazine pouch 10 is sized to hold the plurality of ammunition magazines side by side, for example, the left side of one of the ammunition magazines faces the right side of the second magazine.

Referring to FIGS. 23-29, in the illustrated embodiment, the front cover member 24 includes a pair of opposing sidewalls 30 extending outwardly from a front endwall 32, a bottom endwall 34 extending between the front endwall 32 and the opposing sidewalls 30, a support flange 36 extending outwardly from the opposing sidewalls 30 and the bottom endwall 34, and a pair of opposing raised fastening support members 38 extending outwardly from the opposing sidewalls 30 defined near the open top end of the magazine support assembly 12. The front cover member 24 is coupled to the back plate member 26 such that the support flange 36 contacts a front surface of the back plate member 26. In some embodiments, the support flange 36 of the front cover member 24 is coupled to the front surface of the back plate member 26 with an adhesive. In some embodiments, the front cover member 24 is formed of a unitary body including a thermoplastic material.

Each raised fastening support member 38 includes an inner surface spaced a distance from the back plate member 26 to define a gap 40 between the inner surface of the raised fastening support member 38 and the back plate member 26.

In some embodiments, the front cover member 24 includes a pair of recessed channels 42 defined along an outer surface of the front cover member 24 and extending from the front endwall 32 to the bottom endwall 34. Each recessed channel 42 defines a corresponding dividing ridge 44 extending into the magazine chamber 16 to define a plurality of magazine compartments 46 within the magazine chamber 16. Each magazine compartment 46 is sized and shaped to receive a corresponding ammunition magazine 22 therein. In some embodiments, the front cover member 24 includes a plurality of drain openings 48 spaced along the bottom endwall 34.

Referring to FIGS. 30-34, in the illustrated embodiment, the back plate member 26 includes a support plate 50 having a substantially rectangular cross-sectional shape extending between a front surface 52 and rear surface 54. The front surface 52 defines a portion of the magazine chamber 16 and includes a pair of raised positioning members 56 extending into the magazine chamber 16. Each raised positioning member 56 is orientated with respect to a corresponding dividing ridge 44 of the front cover member 24 and spaced a distance from the corresponding dividing ridge 44 to define the plurality of magazine compartments 46. The support plate 50 may also include an arcuate surface 58 extending along a top portion of the support plate 50 to define the open top end of the magazine chamber 16. In some embodiments, the back plate member 26 is formed of a unitary body including a thermoplastic material.

Referring to FIGS. 1A-20, in the illustrate embodiment, the tensioning assembly 28 includes a plurality of adjustable fastening members 60 coupled between the front cover member 24 and the back plate member 26. The plurality of adjustable fastening members 60 includes a pair of opposing outer fastening members 62 coupled to the opposing raised fastening support members 38 and the back plate member 26. For example, the outer fastening member 62 may include a press-fit threaded insert 64 mounted to the back plate member 26 and a fastening screw 66 extending from the raised fastening support member 38 and into the press-fit threaded insert 64.

The tensioning assembly 28 may also include a pair of inner fastening members 68. Each inner fastening member 68 may be positioned within a corresponding recessed channel 42 and extend outwardly from a corresponding dividing ridge 44 to the back plate member 26. For example, the inner fastening member 68 may include a press-fit threaded insert 64 coupled to corresponding dividing ridge 44 and a fastening screw 66 extending from the corresponding dividing ridge 44 and into the press-fit threaded insert 64.

Referring to FIGS. 34-42, in the illustrated embodiment, the attachment system 14 is coupled to a rear surface of the back plate member 26 and is configured to facilitate mounting the ammunition magazine pouch 10 to a Molle mounting system and/or tactical belt. The attachment system 14 includes an attachment member 70 including an attachment body 72 having a substantially rectangular cross-sectional shape and a mounting strap 74 extending outwardly from a top end of the attachment body 72. In some embodiments, the attachment system 14 may include a pair of mounting straps 74 extending outwardly from a top end of the attachment body 72.

The attachment system 14 may also include a snap button assembly 76 (shown in FIG. 14) including a stud assembly 78 coupled near a bottom end of the attachment body 72 and a socket assembly 80 coupled to a distal end of the mounting strap 74. The mounting strap 74 is adapted to fold along the top end of the attachment body 72 to fasten the corresponding socket assembly 80 to the stud assembly 78. In some embodiments, the attachment member 70 is formed of a unitary body including a polymer-coated fabric composite material. The back plate member 26 may also include a stud opening 82 for coupling the stud assembly 78 to the back plate member 26 through the attachment body 72.

The attachment system 14 also includes a pair of locking tabs 84 coupled to the attachment body 72 and oriented substantially perpendicular to the mounting strap 74. Each locking tab 84 extends between opposing ends that are coupled to the attachment body 72 to allow the mounting strap 74 to be positioned between each locking tab 84 and the attachment body 72 to facilitate mounting the ammunition magazine pouch 10 to a Molle mounting system and/or tactical belt.

In some embodiments, the back plate member 26 may include a plurality of recessed stitching channels 86 (shown in FIG. 34) defined along a front surface of the back plate member 26. The recessed stitching channels 86 are sized and shaped to receive stitching for coupling the attachment body 72 to the support plate 50.

In some embodiments, the attachment system 14 includes the Hyperlock™ Attachment System provided by Safe Life Defense™. The Hyperlock™ Attachment System is an ultra-low profile, lightweight & durable assembly constructed of a Polymer-Coated Cordura® Fabric Composite that allows for easy mounting to nearly anything. Hyperlock™ securely attaches to traditional, mico and laser cut molle as well as slide on belts between 1.5"-2.25." The Hyperlock™ Attachment System includes dual locking tabs at the bottom of the pouch that are specific to the gear the system is mounting to. A top locking tab is used for Micro Molle and 1.5"-2" slide on belts, and a bottom locking tab is used for Traditional Molle and 2.25" slide on belts.

In some embodiments, the front cover member 24 of the magazine support assembly 12 includes a plurality of sidewalls extending outwardly from the support flange 36 to form the magazine chamber 16 that is sized and shaped to receive an ammunition magazine therein. The front endwall 32 is spaced from the support flange 36 along a first axis (e.g., a Z-axis) and extends between the bottom endwall 34 and the left and right sidewalls 30. The bottom endwall 34 is spaced a distance from the open top end 18 along a second axis (e.g., a Y-axis) that is perpendicular to the first Z-axis. The left sidewall is spaced a distance from the right sidewall along a third axis (an X-axis) that is perpendicular to the first Z-axis and the second Y-axis.

In one embodiment, the open top end 18 is configured to receive the plurality of ammunition magazines. The bottom endwall 34 is configured to support and hold the at least one ammunition magazine within the ammunition magazine pouch 10. The front cover member 24 includes a plurality of recessed channels 42 and a pair of raised fastening support members 38. Each recessed channel 42 defines a corresponding magazine compartment 46 configured to receive and house at least one ammunition magazine. Each raised fastening support member 38 is configured to receive the tensioning assembly 28 to couple the front cover member 24 to the back plate member 26.

In various embodiments, the front cover member 24 includes a plurality of fastener openings 88 configured to receive the tensioning assembly 28. The tensioning assembly 28 includes a plurality of adjustable fastening members 60. Each of the plurality of fastener openings 88 on the front cover member 24 includes a cylindrical inner surface extending through the front endwall 32 and is sized and shaped to receive the adjustable fastening members 60 therein. In one embodiment, the front cover member 24 is coupled to the back plate member 26 via the one or more adjustable fastening members 60. The adjustable fastening members 60 includes a press-fit threaded insert 64 that is coupled to the back plate member 26 and a fastening screw 66 inserted through a corresponding fastener openings 88 defined through the front cover member 24 and threadably coupled to the press-fit threaded insert 64 to facilitate coupling the front cover member 24 to the back plate member 26. In some embodiments, the fastening screw 66 includes a head diameter equal to 0.2090 inches. In other embodiments, the fastening screw 66 may include any suitable head diameter.

The back plate member 26 includes a support plate 50. The flexible attachment member 70 is coupled to a rear surface of the support plate 50 and includes a plurality of locking tabs 84 coupled to a rear surface of the flexible attachment member 70. The back support plate 50 includes a substantially rectangular-shaped that includes the front surface 52 and the rear surface 54 along the first Z-axis. The support plate 50 extends between a bottom end, a top end, a left side, and a right side. The bottom end is spaced a distance from the top end along the second Y-axis. The left side is spaced a distance from the right side along the third X-axis. The back plate member 26 further includes at least one raised positioning members 56 having a substantially rectangular shape and extending outwardly from the front surface 52. The raised positioning members 56 extends into the magazine chamber 16 defined between the front cover member 24 and the back plate member 26 and is sized and shaped to assist in holding the ammunition magazine in place in the ammunition magazine pouch 10.

The flexible attachment member 70 includes the attachment body 72 that includes a front surface 90, a rear surface 92, a top end, a bottom end, a left side, a right side, a pair of mounting straps 74 and a plurality of openings 94. The front surface 90 is spaced a distance from the rear surface 92 along the first Z-axis. The top end is spaced a distance from the bottom end along the second Y-axis and the left side is spaced a distance from the right side along the third X-axis. The pair of mounting straps 74 extend out from the top end along the second Y-axis. The plurality of openings 94 are configured to receive the snap button assembly 76. Each of the plurality of openings 94 on the flexible attachment member 70 includes a cylindrical inner surface extending through the front surface 90 and is sized and shaped to receive the snap button assembly 76 therein. The front surface 90 of the flexible attachment member 70 is coupled to the rear surface 54 of the back plate member 26.

In one embodiment, the pair of mounting straps 74 are configured to attach the ammunition magazine pouch 10 to a utility belt. Each mounting strap 74 includes at least one hole where each hole includes a cylindrical inner surface extending between the front surface 90 and the rear surface 92 and is sized and shaped to receive the socket assembly 80 therein. The pair of mounting straps 74 can then be bent to snap and secure the ammunition magazine pouch 10 to the utility belt.

The pair of locking tabs 84 includes a top locking tab 96 and a bottom locking tab 98. The top locking tab 96 includes a front side, a back side, a top end, a bottom end, a left side, and a right side. The front side is spaced a distance from the back side along the first Z-axis. The top end is spaced a distance from the bottom end along the second Y-axis and the left side is spaced a distance from the right side along the third X-axis. The bottom locking tab 98 includes a front side, a back side, a top end, a bottom end, a left side, and a right side. The front side is spaced a distance from the back side along the first Z-axis. The top end is spaced a distance from the bottom end along the second Y-axis and the left side is spaced a distance from the right side along the third X-axis. The back side of the top locking tab 96 and the back side of the bottom locking tab 98 are partially coupled to the rear surface 92 of the flexible attachment member 70. The top locking tab 96 is spaced a distance from the bottom locking tab 98 along the second Y-axis. The top locking tab 96 and the bottom locking tab 98 are configured to assist in coupling the ammunition magazine pouch 10 to, for example, a utility belt. In one embodiment, shown in FIG. 14, the bottom locking tab 98 includes a slit extending between the left and right side along the second Y-axis.

Referring to FIGS. 43-62, in some embodiments, the present invention describes a system 100 for manufacturing the tactical pouch 10. The system 100 includes a thermoplastic machine assembly 102 and a Computerized Numerical Control (CNC) milling machine 104. The thermoplastic machine assembly 102 includes a support frame 106, a heat press machine 108 mounted to the support frame 106, a vacuum forming machine assembly 110 mounted to the support frame 106 and positioned adjacent to the heat press machine 108, and a support sled 112 slideably coupled to the support frame 106. The heat press machine 108 is configured to apply a heat and pressure treatment to a sheet of thermoplastic material to facilitate thermoforming the thermoplastic material.

The vacuum forming machine assembly 110 includes a mold support frame 114 for supporting a mold assembly 116, a hydraulic lifting assembly 118 coupled to the mold support frame 114, and a vacuum pressure system 100. The hydraulic lifting assembly 118 is configured to move the mold support frame 114 between a first vertical position (shown in FIG. 43) and a second vertical position (shown in FIG. 44). The vacuum pressure system 100 is coupled to the mold support frame 114 and configured to apply a vacuum pressure to the mold assembly 116 with the mold support frame 114 in the second vertical position.

The support sled 112 is movable between the heat press machine 108 and the vacuum forming machine assembly 110, and is configured to receive a sheet of thermoplastic material 120 therein to move the sheet of thermoplastic material 120 between the heat press machine 108 and the vacuum forming machine assembly 110. The support sled 112 is positionable between a first sled position (shown in FIG. 46) with the sheet of thermoplastic material positioned within the heat press machine 108, and a second sled position (shown in FIG. 45) with the sheet of thermoplastic material positioned above the vacuum forming machine assembly 110.

In the illustrated embodiment, the support sled 112 includes a slide rail assembly 122 mounted to the support frame 106, a base sled frame 124 mounted to the slide rail assembly 122, and a cover frame 126 that is pivotably mounted to the base sled frame 124. The cover frame 126 is positionable between an open position (shown in FIG. 44) and a closed position (shown in FIG. 45.

The base sled frame 124 includes a frame member 128, a support flange 130, and a first sealing gasket 132 mounted on the support flange 130. The frame member 128 defines a mold opening having a substantially rectangular cross-sectional shape. The mold opening is sized and shaped to receive the mold assembly 116 therein. The support flange 130 extends inwardly from the frame member 128 about a perimeter of the mold opening.

The support sled 112 is configured to support a sheet of thermoplastic material 120 between the first sealing gasket 132 of the base sled frame 124 and the cover frame 126 with the cover frame 126 in the closed position.

In the illustrated embodiment, the mold support frame 114 includes a second sealing gasket 134 positioned about a perimeter of the mold assembly 116. The second sealing gasket 134 of the mold support frame 114 contacts the first sealing gasket 132 of the base sled frame 124 when the mold support frame 114 is moved to the second vertical position to facilitate a vacuum seal being created between the mold assembly 116 and the sheet of thermoplastic material 120.

During operation, the vacuum pressure system 100 applies the vacuum pressure to the mold assembly 116 with the sheet of thermoplastic material 120 supported between the first sealing gasket 132 of the base sled frame 124 and the cover frame 126, and with the second sealing gasket 134 of the mold support frame 114 in contact with the first sealing gasket 132 of the base sled frame 124.

In some embodiments, the mold assembly 116 includes an array 136 of positive front cover mold assemblies 138. The positive front cover mold assembly 138 includes a base member 140 and a cover member 142 extending outwardly from the base member 140. The cover member 142 includes a plurality of sidewalls 144, 146, 148 extending between a first endwall 150 and an opposite second endwall 152. The plurality of sidewalls includes a top sidewall 146 and a pair of opposing sidewalls 144, 148 extending outwardly from the top sidewall 146 towards the base member 140. A pair of opposing raised members 154 are positioned adjacent each opposing sidewall 144, 148.

The mold assembly 116 may also include an array 156 of positive back plate mold assemblies 158. The positive back plate mold assembly 158 includes a base member 160 and a pair of opposing back plate mold members 162 that extend outwardly from the base member 160. The pair of opposing back plate mold members 162 are spaced a distance apart and arranged in a mirrored relationship. In the illustrated embodiment, each back plate mold member 162 includes a planar outer surface 164 and a pair of raised positioning members 166 extending outwardly from the planar outer surface 164. Each raised positioning member 166 includes a top endwall extending between a pair of sidewalls, a first endwall, and a second endwall opposite the first endwall. The second endwall extends from the top endwall towards the planar outer surface 164 at an oblique angle.

The CNC milling machine 104 includes a table 168, a CNC milling assembly 170 mounted above the table 168, a vacuum mold assembly 172 mounted on the table, and a vacuum pressure system 100 coupled to the vacuum mold assembly 172. The vacuum mold assembly 172 includes a support plate 174 and a support mold 174 mounted to the support plate 174. The support mold 174 includes a base member 176, a plurality of positioning members 178 extending outwardly from the base member 176, a plurality of openings 180 extending through the base member 176, and a plurality of silicone gaskets 182 mounted on the base member 176. The vacuum pressure system 100 is configured to apply a vacuum pressure to the vacuum mold assembly 172 through the plurality of openings 180 to facilitate mounting a hardened thermoplastic assembly to the support mold 174 during a milling operation.

In some embodiments, the system 100 may include a stitching mold assembly 184 that includes stitching base mold 186 and a stitching guide mold 188. The stitching base mold 186 includes a recessed area 190 sized and shaped to receive the attachment member 70 therein, and one or more recessed channels 192 defined within the recessed area 190 that are sized and shaped to receive a corresponding locking tab 84 therein. The stitching guide mold 188 includes a stitching guide mold body including a plurality of stitching guide slots 194 that are defined along the stitching guide mold body.

In some embodiments, the present invention includes a molding assembly 116 for forming the ammunition magazine pouch 10. The molding assembly 116 includes a plurality of molds to help form the different components of the ammunition magazine pouch 10. The plurality of molds includes a back form cutout mold 158, a back form full array mold 156, a front form mold 138, a brother pallet clamp mold 184, a pallet clamp base mold 186, and a pallet clamp top mold 188. The plurality of molds are configured to help form the different components of the ammunition magazine pouch 10. For instance, the back form cutout mold 158 is configured to form the back support member 26 by pressing the material over the mold and cutting each individual component of the ammunition magazine pouch 10. The material used to make the ammunition magazine pouch 10 is passed under a specific tool and pressed against the plurality of molds to make each part.

In one embodiment, the back form cutout mold 158 is configured to make the back support member 26. The back form full array mold 156 is configured to form a plurality of back support members. Similar to the back form cutout mold 158, the front form mold 138 is configured to make a plurality of magazine front cover members 24 where the material used to make each magazine front cover member 24 is pressed or molded against the front form mold.

In another embodiment, the brother pallet claim mold, the pallet clamp base mold, and the pallet clamp top mold each include a plurality of holes. The plurality of holes are used as a template to drill the plurality of fastener openings for receiving the fastening assembly on both the magazine support member and the back plate assembly. For example, the pallet clamp base mold is placed on the finished flexible fastening member to layout where the plurality of openings need to be cut. Once each of the components of the ammunition magazine pouch 10 are formed each opening is sized and cut to receive a corresponding bolt set or snap set from the fastening assembly.

Figure 63:
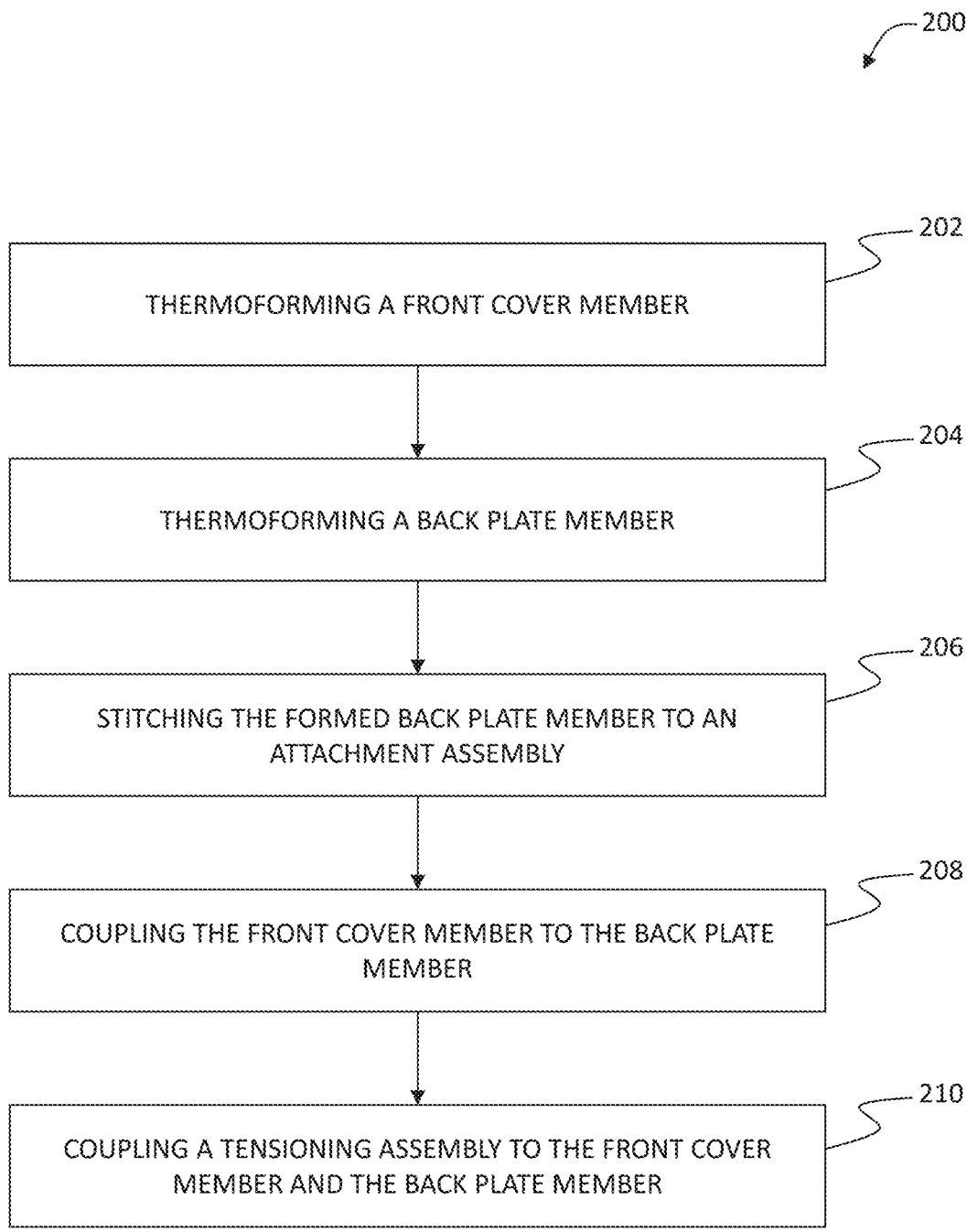
FIG. 63 is a flowchart illustrating a method of manufacturing the ammunition magazine pouch, according to embodiments of the present invention.

FIG. 63 is a flowchart illustrating a method 200 of manufacturing the tactical pouch 10. The method includes a plurality of steps. Each method step may be performed independently of, or in combination with, other method steps. Portions of the methods may be performed by any one of, or any combination of, the components of the system 100.

Method step 202 includes thermoforming a front cover member 24 from a first sheet of thermoplastic material 120. For example, the first sheet of thermoplastic material 120 is placed within the support sled 112 with the support sled 112 in the second sled position and with the mold support frame 114 positioned in the first vertical positions such that the mold assembly 116 does not contact the sheet of thermoplastic material 120. The first sheet of thermoplastic material 120 is placed onto the base sled frame 124 and supported by the support flange 130 and a first sealing gasket 132 about a perimeter of the about a perimeter of the first sheet of thermoplastic material 120. The cover frame 126 is then moved to the closed position and secured with a locking clamp. The support sled 112 is then moved to the first sled position to position the first sheet of thermoplastic material 120 within the heat press machine 108.

The heat press machine 108 is then operated to apply a heat treatment to the first sheet of thermoplastic material 120 to form a malleable thermoplastic sheet. For example, the heat press machine 108 is operated to apply the heat treatment at a predefined temperature and predefined pressure for a predefined period of time. At the completion of the heat treatment, the support sled 112 is then moved from the first sled position to the second sled position to position the malleable thermoplastic sheet over the mold assembly 116 including the array 136 of positive front cover mold assemblies 138. The hydraulic lifting assembly 118 then operates to move the mold support frame 114 and mold assembly 116 from the first vertical position to the second vertical position to place the second sealing gasket 134 of the mold support frame 114 in contact with the first sealing gasket 132 of the base sled frame 124. The vacuum pressure system 100 then applies a vacuum pressure to the malleable thermoplastic sheet to form a molded front cover assembly over the positive front cover mold assembly 138. A fan is then operated to facilitate cooling the molded front cover assembly to form a hardened front cover assembly.

Once the hardened front cover assembly is formed, the vacuum pressure system 100 is operated to release the vacuum pressure, the hydraulic lifting assembly 118 is operated to move the mold support frame 114 and mold assembly 116 from the second vertical position to the first vertical position, and the hardened front cover assembly is removed from the support sled 112 and placed over the vacuum mold assembly 172 of the CNC milling machine 104. The vacuum pressure system 100 of the CNC milling machine 104 is then operated to apply a vacuum pressure to the vacuum mold assembly 172 to facilitate mounting the hardened front cover assembly to the support mold 174. The CNC milling machine 104 is then operated to mill excess material from the hardened front cover assembly and drill a plurality of fastener openings through the hardened front cover assembly for receiving the adjustable fastening members 60 of the tensioning assembly 28. The milled hardened front cover assembly is then cut in half to form two front cover members 24.

Method step 204 includes thermoforming a back plate member 26 from a second sheet of thermoplastic material 120. Similar to the process of method step 202, the second sheet of thermoplastic material 120 is placed within the support sled 112 with the support sled 112 in the second sled position and with the mold support frame 114 positioned in the first vertical position. The cover frame 126 is then moved to the closed position and the support sled 112 is moved to the first sled position to position the second sheet of thermoplastic material 120 within the heat press machine 108.

The heat press machine 108 is then operated to apply a heat treatment to the second sheet of thermoplastic material 120 to form a second malleable thermoplastic sheet. At the completion of the heat treatment, the support sled 112 is then moved from the first sled position to the second sled position to position the second malleable thermoplastic sheet over the mold assembly 116 including the array 156 of positive back plate mold assemblies 158. The hydraulic lifting assembly 118 then operates to move the mold support frame 114 and mold assembly 116 from the first vertical position to the second vertical position to position the malleable thermoplastic sheet onto a positive back plate mold assembly 158. The vacuum pressure system 100 then applies a vacuum pressure to the malleable thermoplastic sheet to form a molded back plate assembly over the positive back plate mold assembly 158, and a fan is operated to facilitate cooling the molded back plate assembly to form a hardened back plate assembly.

The hardened back plate assembly is then removed from the support sled 112 and placed over the vacuum mold assembly 172 of the CNC milling machine 104. The vacuum pressure system 100 of the CNC milling machine 104 is then operated to apply a vacuum pressure to the vacuum mold assembly 172 to facilitate mounting the hardened back plate assembly to the support mold 174. The CNC milling machine 104 is then operated to mill excess material from the hardened back plate assembly and drill a plurality of fastener openings and stud openings through the hardened front cover assembly for receiving the adjustable fastening members 60 of the tensioning assembly 28 and the attachment system 14. The CNC milling machine 104 is also operated to etch the recessed stitching channels 86 along the front surface of the back plate member 26 for receiving the stitching for coupling the attachment system to the back plate member 26. The milled hardened back plate assembly is then cut in half to form two back plate members 26.

Method step 206 includes stitching the back plate member 26 to an attachment system 14. For example, the attachment system 14 is positioned onto the stitching base mold 186 with the locking tabs 84 positioned in the recessed channels 192 and the attachment member 70 positioned over the locking tabs 84 within the recessed area 190. The back plate member 26 is then positioned onto the attachment system 14 within the recessed area 190. The stitching guide mold 188 is then positioned onto the back plate member 26, and a stitching machine is operated to apply stitching to the attachment system 14 and the back plate member 26 along the plurality of stitching guide slots 194. The recessed stitching channels 86 of the back plate member 26 correspond to the stitching guide slots 194 to facilitate reducing stitching protruding into the magazine chamber 16. The snap button assembly 76 is then coupled to the attachment member 70 and the back plate member 26.

Method step 208 includes coupling the front cover member 24 to the back plate member 26 to define the magazine chamber 16 therebetween and extending between the open top end 18 and the closed bottom end 20. For example, the front cover member 24 may be coupled to the back plate member 26 with an adhesive such that the support flange 36 is adhered to the front surface of the back plate member 26.

Method step 210 includes coupling the tensioning assembly 28 to the front cover member 24 and the back plate member 26 to form the tactical pouch 10. In some embodiments, press-fit threaded inserts are mounted to the back plate member 26 before adhesive is applied and the front cover member 24 is coupled to the back plate member 26. The fastening screws are then inserted through the fastener openings and into the press-fit threaded inserts.

Obviously, many modifications and variations of the present invention are possible in light of the above teachings. The invention may be practiced otherwise than as specifically described within the scope of the appended claims.

Although specific features of various embodiments of the disclosure may be shown in some drawings and not in others, this is for convenience only. In accordance with the principles of the disclosure, any feature of a drawing or other embodiment may be referenced and/or claimed in combination with any feature of any other drawing or embodiment.

This written description uses examples to describe embodiments of the disclosure and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An ammunition magazine pouch comprising:
a magazine support assembly including an interior surface defining a magazine chamber extending between an open top end and a closed bottom end, the magazine chamber configured to receive at least one ammunition magazine therein, the magazine support assembly including:
a front cover member formed of a unitary body including:
an inner surface defining a portion of the magazine chamber;
a pair of opposing sidewalls extending outwardly from a front endwall;
a bottom endwall extending between the front endwall and the opposing sidewalls;
a support flange extending outwardly from the opposing sidewalls and the bottom endwall defining a perimeter of the front cover member; and
a pair of recessed channels defined along an outer surface of the front cover member and extending from the front endwall to the bottom endwall, each recessed channel defines a corresponding dividing ridge extending into the magazine chamber to define a plurality of magazine compartments within the magazine chamber, each magazine compartment configured to receive a corresponding ammunition magazine therein;
a back plate member coupled to the front cover member to define the magazine chamber therebetween, the back plate member including a support plate having a substantially rectangular cross-sectional shape extending between a front surface and a rear surface, the front surface coupled to the support flange of the front cover member with an adhesive and including a pair of raised positioning members extending into the magazine chamber, each raised positioning member orientated with respect to a corresponding dividing ridge of the front cover member to define the plurality of magazine compartments; and
a tensioning assembly including a plurality of adjustable fastening members spaced along an upper portion of the front cover member and coupled between the front cover member and the back plate member, and configured to adjust a distance between the upper portion of the front cover member and an upper portion of the back plate member to adjust a width of the open top end of the magazine chamber; and
an attachment system coupled to the rear surface of the back plate member and including:
an attachment member including an attachment body and a pair of mounting straps extending outwardly from a top end of the attachment body, the attachment body having a cross-sectional shape similar to the substantially rectangular cross-sectional shape of the support plate of the back plate member; and
a pair of locking tabs coupled to the attachment body and oriented substantially perpendicular to the pair of mounting straps;
wherein the back plate member includes a plurality of recessed stitching channels defined along the front surface of the back plate member and configured to receive stitching for coupling the attachment body to the support plate.

2. The ammunition magazine pouch of claim 1, wherein the front cover member includes:
a pair of opposing raised fastening support members extending outwardly from the opposing sidewalls defined near the open top end of the magazine support assembly.

3. The ammunition magazine pouch of claim 2, wherein the plurality of adjustable fastening members includes a pair of opposing outer fastening members coupled to the opposing raised fastening support members and the back plate member.

4. The ammunition magazine pouch of claim 3, wherein each raised fastening support member includes an inner surface spaced a distance from the back plate member to define a gap between the inner surface of the raised fastening support member and the back plate member.

5. The ammunition magazine pouch of claim 4, wherein each outer fastening member includes a press-fit threaded insert mounted to the back plate member and a fastening screw extending from the raised fastening support member and into the press-fit threaded insert.

6. The ammunition magazine pouch of claim 2, wherein the front cover member includes a plurality of drain openings spaced along the bottom endwall.

7. The ammunition magazine pouch of claim 2, wherein the front cover member is formed of a thermoplastic material.

8. The ammunition magazine of claim 1, wherein the attachment system includes:
- a snap button assembly associated with each mounting strap, each snap button assembly including a stud assembly coupled near a bottom end of the attachment body and a socket assembly coupled to a distal end of a corresponding mounting strap, each mounting strap adapted to fold along the top end of the attachment body to fasten the corresponding socket assembly to a corresponding stud assembly.

9. The ammunition magazine of claim 8, wherein the back plate member includes a pair of stud openings for coupling each stud assembly to the back plate member and through the attachment body.

10. The ammunition magazine pouch of claim 9, wherein each locking tab extends between opposing ends that are coupled to the attachment body to allow each mounting strap to be positioned between each locking tab and the attachment body to facilitate mounting the ammunition magazine pouch to a Molle mounting system and/or tactical belt.

11. The ammunition magazine pouch of claim 1, wherein the attachment member is formed of a unitary body including a polymer-coated fabric composite material.

12. The ammunition magazine pouch of claim 1, wherein the tensioning assembly includes a pair of inner fastening members, each inner fastening member positioned within a corresponding recessed channel and extending outwardly from a corresponding dividing ridge to the back plate member.

13. The ammunition magazine pouch of claim 12, wherein each raised positioning member is spaced a distance from the corresponding dividing ridge, each inner fastening member includes a press-fit threaded insert coupled to corresponding dividing ridge and a fastening screw extending from the corresponding dividing ridge and into the press-fit threaded insert.

14. The ammunition magazine pouch of claim 13, wherein the support plate includes an arcuate surface extending along a top portion of the support plate to define the open top end of the magazine chamber.

\* \* \* \* \*